United States Patent
Glemarec et al.

(10) Patent No.: US 11,732,674 B2
(45) Date of Patent: Aug. 22, 2023

(54) NACELLE FOR A BYPASS TURBOMACHINE COMPRISING A THRUST REVERSER, BYPASS TURBOMACHINE COMPRISING SUCH A NACELLE, AND AIRCRAFT COMPRISING AT LEAST ONE SUCH TURBOMACHINE

(71) Applicant: SAFRAN AIRCRAFT ENGINES, Paris (FR)

(72) Inventors: Guillaume Glemarec, Moissy-Cramayel (FR); Quentin Matthias Emmanuel Garnaud, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 156 days.

(21) Appl. No.: 17/438,992

(22) PCT Filed: Mar. 13, 2020

(86) PCT No.: PCT/HR2020/050529
§ 371 (c)(1),
(2) Date: Sep. 14, 2021

(87) PCT Pub. No.: WO2020/188200
PCT Pub. Date: Sep. 24, 2020

(65) Prior Publication Data
US 2022/0178330 A1    Jun. 9, 2022

(30) Foreign Application Priority Data
Mar. 19, 2019    (FR) ...................................... 1902796

(51) Int. Cl.
*F02K 1/76*    (2006.01)
*F02K 1/72*    (2006.01)

(52) U.S. Cl.
CPC ................ *F02K 1/763* (2013.01); *F02K 1/72* (2013.01); *F02K 1/766* (2013.01)

(58) Field of Classification Search
CPC ... F02K 1/763; F02K 1/70; F02K 1/72; F02K 1/766; F05D 2240/129
See application file for complete search history.

(56) References Cited

U.S. PATENT DOCUMENTS

| 3,981,451 A * | 9/1976 | Prior | ........................ F02K 1/72 239/265.33 |
| 6,256,980 B1 * | 7/2001 | Lecordix | ................... F02K 1/72 239/265.29 |

(Continued)

FOREIGN PATENT DOCUMENTS

| WO | 2013186475 A1 | 12/2013 |
| WO | 2015019007 A1 | 2/2015 |

OTHER PUBLICATIONS

Search Report issued in French Patent Application No. 1902796 dated Oct. 24, 2019.

(Continued)

*Primary Examiner* — Andrew H Nguyen
(74) *Attorney, Agent, or Firm* — Pearne & Gordon LLP

(57) ABSTRACT

A nacelle for an aircraft bypass turbomachine, including: an annular envelope extending about a longitudinal axis, a thrust reverser including: an annular movable cowl situated downstream of the annular envelope and able to slide with respect to the annular envelope along the longitudinal axis between a closed position and an open position in which the cowl and the nacelle casing define an opening between one another, at least one first thrust reverser cascade, an actuating mechanism designed to allow a partial or total thrust-cancelling configuration of the thrust reverser, in which configuration the movable cowl is moved into its open position while maintaining the or each first cascade in its (Continued)

retracted position, the opening being occupied by at least one second thrust-attenuating cascade of the thrust reverser, in such a way that the secondary flow passing through the opening exits to the outside of the nacelle with a speed oriented so as to generate a substantially zero or positive thrust along the longitudinal axis.

12 Claims, 11 Drawing Sheets

(56) References Cited

U.S. PATENT DOCUMENTS

| | | | |
|---|---|---|---|
| 9,982,627 B2* | 5/2018 | Teia Dos Santos Mendes Gomes | F02K 1/70 |
| 10,119,495 B1 | 11/2018 | Nestico et al. | |
| 2002/0124550 A1* | 9/2002 | Stretton | F02K 1/72 60/226.2 |
| 2019/0195170 A1 | 6/2019 | Patsouris et al. | |

OTHER PUBLICATIONS

International Search Report for issued in Application No. PCT/FR2020/050529 dated Sep. 22, 2020.

Written Opinion for PCT/FR2020/050529 dated Sep. 22, 2020.

* cited by examiner

NACELLE FOR A BYPASS TURBOMACHINE COMPRISING A THRUST REVERSER, BYPASS TURBOMACHINE COMPRISING SUCH A NACELLE, AND AIRCRAFT COMPRISING AT LEAST ONE SUCH TURBOMACHINE

This is the National Stage of PCT international application PCT/FR2020/050529, filed on Mar. 13, 2020 entitled "NACELLE FOR A BYPASS TURBOMACHINE COMPRISING A THRUST REVERSER", which claims the priority of French Patent Application No. 1902796 filed Mar. 19, 2019, both of which are incorporated herein by reference in their entirety.

DESCRIPTION

Technical Field

The invention relates to a nacelle for a bypass turbomachine comprising a thrust reverser, to a bypass turbomachine comprising such a nacelle, and to an aircraft comprising at least one such turbomachine.

Prior Art

Conventionally, an aircraft bypass turbomachine comprises a fan for drawing in a gas stream which is divided, downstream of the fan, into a primary gas stream flowing in a primary flow channel, referred to as the primary flow path, within a core of the turbomachine, and into a secondary gas stream bypassing this core in a secondary flow channel, referred to as the secondary flow path.

In the primary flow path, the primary gas stream flows, in the upstream to downstream direction, through a low-pressure compressor, a high-pressure compressor, a combustion chamber, a high-pressure turbine, a low-pressure turbine and an exhaust nozzle. In the secondary flow path, the secondary gas stream can flow through a guide vane assembly.

Both the primary gas stream and the secondary gas stream contribute to producing the total thrust of the turbomachine, which is thus particularly high.

The turbomachine is further ducted by a nacelle which surrounds the secondary flow path and defines, upstream, an air intake through which the gas stream enters the turbomachine.

While it is advantageous for such a high total thrust to be produced during some phases of aircraft flight and at some turbomachine speeds, this tends to be problematic during other phases of flight and at other speeds such as at idle speed.

This is the case, for example, in the landing phase, when the aircraft is approaching the ground and is idling, making it difficult for the aircraft to descend rapidly to the ground.

This is also the case in the landing phase, when the aircraft has touched down on the runway. More specifically, the aircraft's brakes must be supplemented with a thrust reverser mounted on the nacelle of the turbomachine in order to reduce the braking distance of the aircraft on the runway. For this purpose, the thrust reverser is designed to exhaust the gas stream flowing along the secondary flow path to the outside by directing it upstream of the nacelle and thus create a counter-thrust or negative thrust.

However, use of the thrust reverser is only permitted for aircraft speeds above a predefined speed limit, for example 60 knots (111.12 km/h). Below this speed limit, there is too great a risk of the turbomachine re-ingesting the gas stream exhausted by the thrust reverser upstream of the nacelle, and also of ingesting debris from the runway thrown up by the gas stream exhausted by the thrust reverser, both of which can cause damage to the turbomachine.

This is also the case when the aircraft is at a standstill on the ground, where braking of the aircraft is required in order to keep the aircraft stationary, or even when taxiing on the runway, on the ground, where only the braking of the aircraft allows the speed of the aircraft to be regulated, where use of the thrust reverser being restricted to aircraft speeds above the speed limit.

DESCRIPTION OF THE INVENTION

The invention aims to overcome the above-mentioned drawbacks by proposing a nacelle for an aircraft bypass turbomachine comprising a thrust reverser which is capable of operating on the one hand in reverse thrust mode, and on the other hand in partial or total thrust-cancelling mode.

More specifically, the invention relates to a nacelle for an aircraft bypass turbomachine wherein an intake air stream flows in the upstream to downstream direction, separating into a primary flow channel and a secondary flow channel, the nacelle comprising:
  a fixed annular envelope extending about a longitudinal axis of the nacelle,
  a thrust reverser comprising:
    an annular movable cowl extending about the longitudinal axis and located downstream of the annular envelope, the movable cowl being able to slide relative to the annular envelope along the longitudinal axis between a closed position, wherein the movable cowl and the annular envelope jointly define an annular and continuous outer surface of the nacelle, and an open position wherein the movable cowl and the annular envelope define therebetween an opening oriented radially relative to the longitudinal axis, said opening extending circumferentially about the longitudinal axis,
    at least one first movable thrust-reversing cascade, capable of occupying a retracted position wherein, with the movable cowl in the closed position, the first cascade is housed inside the annular envelope, and an extended position wherein, with the movable cowl in the open position, the first cascade extends across the opening, such that at least a part of the secondary stream is capable of passing through the first cascade in the extended position in order to emerge outside the nacelle with a velocity that is oriented so as to generate a negative thrust along the longitudinal axis, the movable cowl and the or each first cascade being connected to an actuating mechanism capable of moving them together, said actuating mechanism being further designed to allow for a partial or total thrust-cancelling configuration of the thrust reverser wherein the movable cowl is moved into the open position thereof while holding the or each first cascade in the retracted position thereof, the opening being occupied by at least one second thrust-reducing cascade of the thrust reverser, in said thrust-cancelling configuration, in such a way that the secondary stream passing through the opening emerges outside the nacelle with a velocity that is oriented so as to generate a substantially zero or positive thrust along the longitudinal axis.

According to alternative embodiments, which may be taken together or separately:

the one or more first cascades are designed to send a gas stream flowing in the upstream to downstream direction along the secondary flow path to the outside and upstream of the nacelle;

the one or more first cascades have vanes forming a first angle with the longitudinal axis comprised between 110° and 150°, in particular equal to 120°, a radially inner end of the vanes, relative to the longitudinal axis, being located downstream, and a radially outer end of the vanes, relative to the longitudinal axis, being located upstream;

the one or more second cascades are designed to send a gas stream flowing in the upstream to downstream direction along the secondary flow path to the outside and downstream of the nacelle;

the one or more second cascades have vanes forming a second angle with the longitudinal axis comprised between 30° and 60°, in particular equal to 45°, a radially inner end of the vanes, relative to the longitudinal axis, being located upstream, and a radially outer end of the vanes, relative to the longitudinal axis, being located downstream;

the thrust reverser further comprises at least one reverser door designed to move from a retracted position wherein the one or more reverser doors are intended to unblock the secondary flow path, into a deployed position wherein the one or more reverser doors are intended to axially block the secondary flow path, when the cowl slides from the closed position into the open position;

the actuating mechanism is designed to selectively:
move the movable cowl and the one or more first cascades by sliding along the longitudinal axis respectively from the closed position into the open position and from the retracted position into the extended position;
hold the one or more first cascades in the retracted position and move the movable cowl by sliding along the longitudinal axis between the closed position and the open position;

the actuating mechanism comprises at least one first actuator designed to cause the movable cowl to slide along the longitudinal axis between the closed position and the open position;

the actuating mechanism comprises at least one first blocking member designed to block the one or more first cascades from sliding relative to the movable cowl along the longitudinal axis, in a first blocking position, and to unblock the one or more first cascades such that they can slide relative to the movable cowl along the longitudinal axis, in a second blocking position;

the actuating mechanism comprises at least one second blocking member designed to unblock the one or more first cascades such that they can slide relative to the annular envelope along the longitudinal axis, in a third blocking position, and to block the one or more first cascades from sliding relative to the annular envelope along the longitudinal axis, the one or more first cascades being in the retracted position, in a fourth blocking position;

the or each second thrust-reducing cascade is designed to selectively:
occupy a retracted position wherein it is housed inside the annular envelope of the nacelle, said second cascade in the retracted position being radially superimposed relative to the longitudinal axis with a first cascade when the movable cowl is in the closed position;
remain in the retracted position when the movable cowl and the first cascade slide respectively from the closed position into the open position and from the retracted position into the extended position;
slide relative to the annular envelope of the nacelle along the longitudinal axis from the retracted position into an extended position wherein the second cascade occupies the opening defined between the movable cowl and the annular envelope, when the first cascade is in the retracted position and when the movable cowl slides from the closed position into the open position.

the one or more second cascades are arranged radially outside the one or more first cascades relative to the longitudinal axis;

the actuating mechanism is designed to selectively:
hold the one or more second cascades in the retracted position and move the movable cowl and the one or more first cascades by sliding along the longitudinal axis respectively from the closed position into the open position and from the retracted position into the extended position;
hold the one or more first cascades in the retracted position and move the movable cowl and the one or more second cascades by sliding along the longitudinal axis respectively from the closed position into the open position and from the retracted position into the extended position;

the actuating mechanism comprises at least one first blocking member designed to:
on the one hand block the one or more first cascades from sliding relative to the movable cowl along the longitudinal axis, in a first blocking position, and unblock the one or more first cascades such that they can slide relative to the movable cowl along the longitudinal axis, in a second blocking position; and
on the other hand, unblock the one or more second cascades such that they can slide relative to the movable cowl along the longitudinal axis, in the first blocking position, and block the one or more second cascades from sliding relative to the movable cowl along the longitudinal axis, in the second blocking position;

the actuating mechanism comprises at least one second blocking member designed to:
on the one hand, unblock the one or more first cascades such that they can slide relative to the annular envelope along the longitudinal axis, in a third blocking position, and block the one or more first cascades from sliding relative to the annular envelope along the longitudinal axis, the one or more first cascades being in the retracted position, in a fourth blocking position;
on the other hand, block the one or more second cascades from sliding relative to the annular envelope along the longitudinal axis, the one or more second cascades being in the retracted position, in the third blocking position, and unblock the one or more second cascades such that they can slide relative to the annular envelope along the longitudinal axis, in the fourth blocking position.

The invention further relates to an aircraft bypass turbomachine comprising, upstream to downstream in an axial direction of flow of a gas, a fan and a separation nozzle from which emerge an annular primary flow channel, referred to as the primary flow path, and an annular secondary flow channel, referred to as the secondary flow path, surrounding the primary flow path, the turbomachine furthermore being ducted by a nacelle as described hereinabove.

The invention further relates to an aircraft comprising at least one bypass turbomachine as described hereinabove.

BRIEF DESCRIPTION OF THE FIGURES

Other aspects, purposes, advantages and features of the invention will be better understood upon reading the following detailed description given of the non-limiting preferred embodiments of the invention, provided for illustration purposes, with reference to the accompanying drawings, in which.

DETAILED DESCRIPTION

Figure 1:
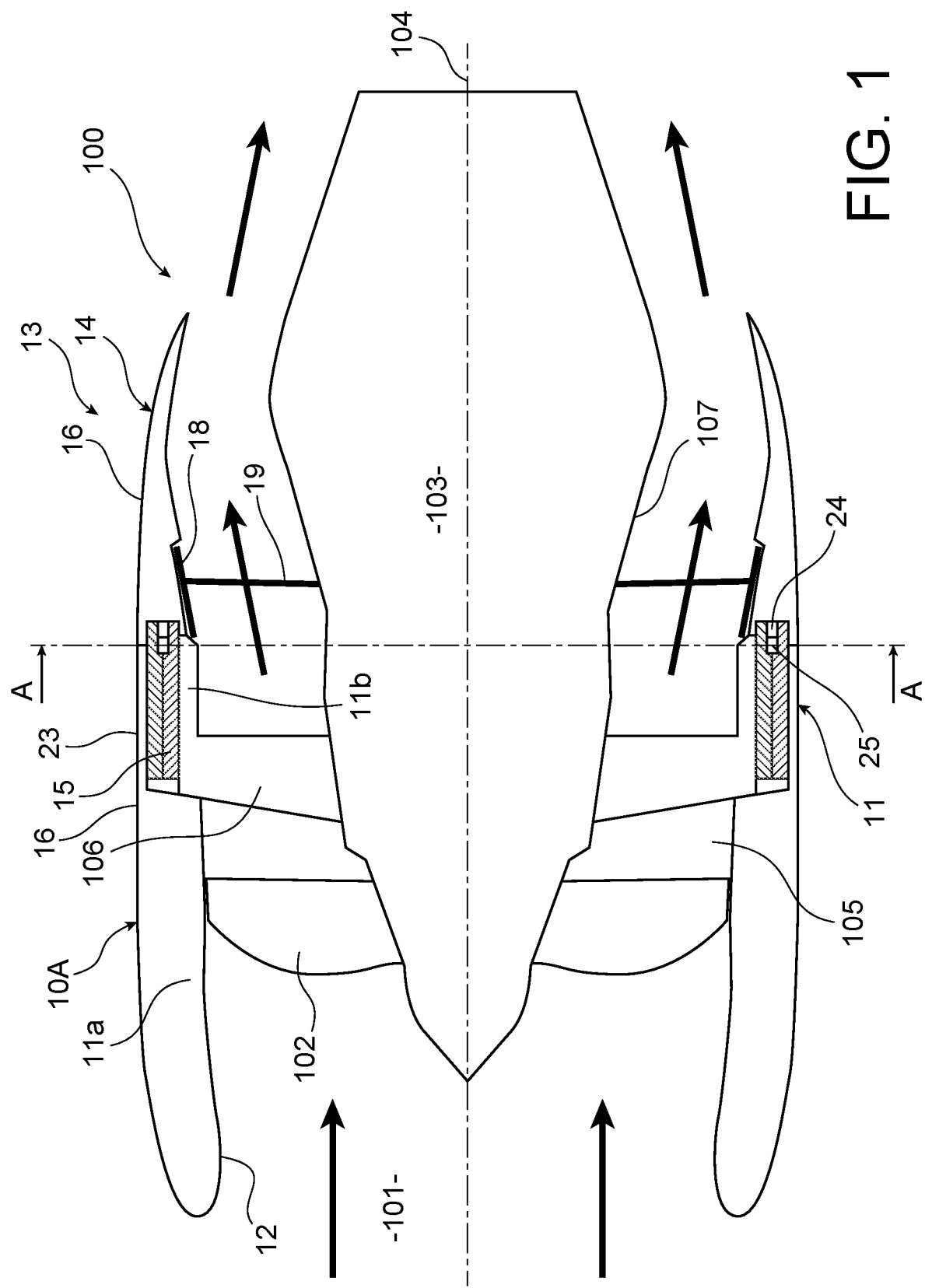
FIG. 1 is a longitudinal sectional view of an aircraft bypass turbomachine comprising a thrust reverser operating in direct jet mode, according to one embodiment of the invention.

FIGS. 1 to 7 show an aircraft bypass turbomachine 100 comprising a nacelle 10A according to one embodiment of the invention. FIGS. 8 to 14 show the turbomachine 100 comprising a nacelle 10B according to another embodiment of the invention. FIG. 15 shows the turbomachine 100 comprising a nacelle 10C according to another embodiment of the invention. The components common to these three embodiments of the invention bear the same reference numerals.

Firstly, an axial direction, a radial direction which is orthogonal to the axial direction, and a circumferential direction which is orthogonal to both the axial and radial directions are defined.

Figure 8:
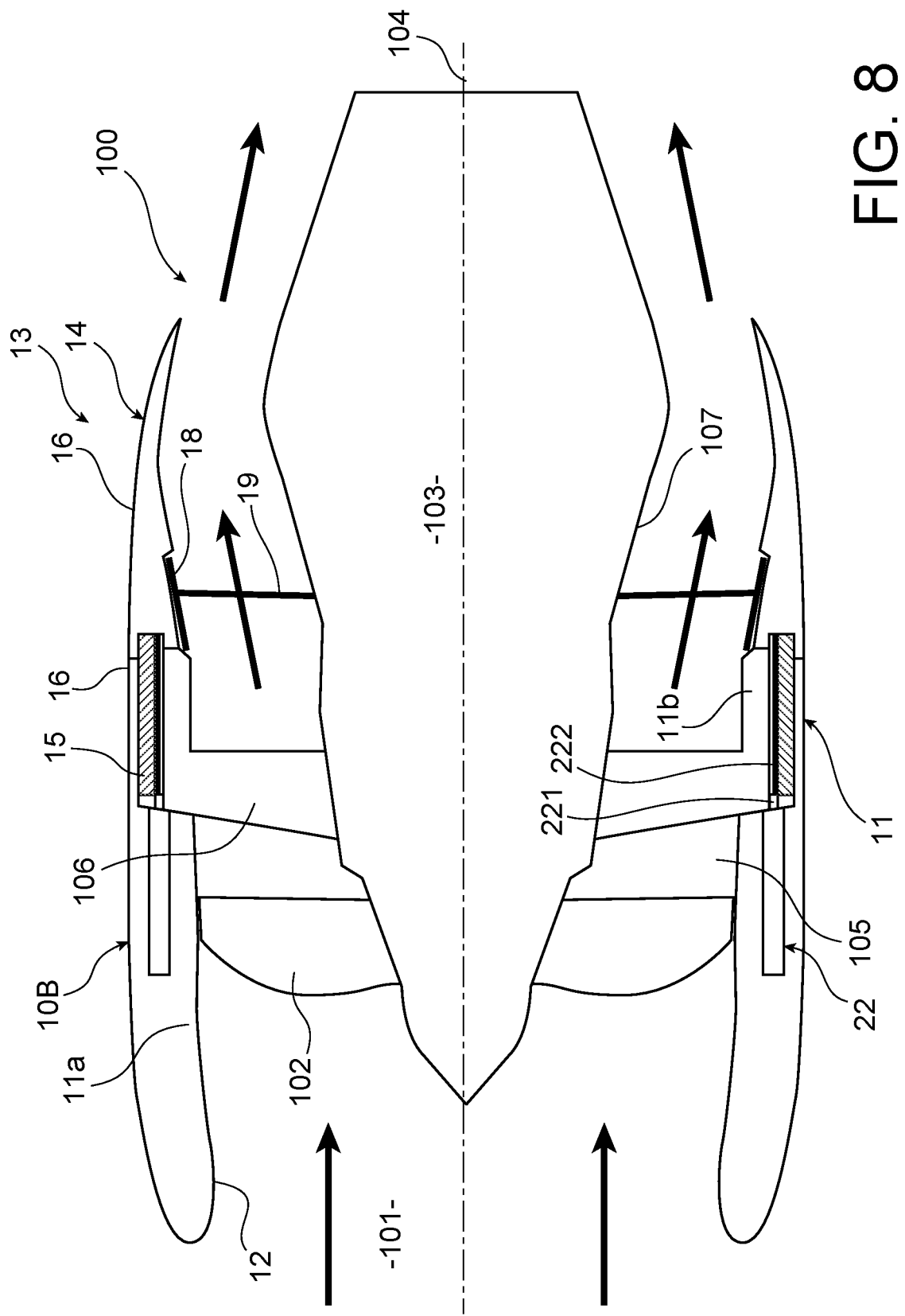
FIG. 8 is a longitudinal sectional view of an aircraft bypass turbomachine comprising a thrust reverser operating in direct jet mode, according to another embodiment of the invention.
Figure 9:
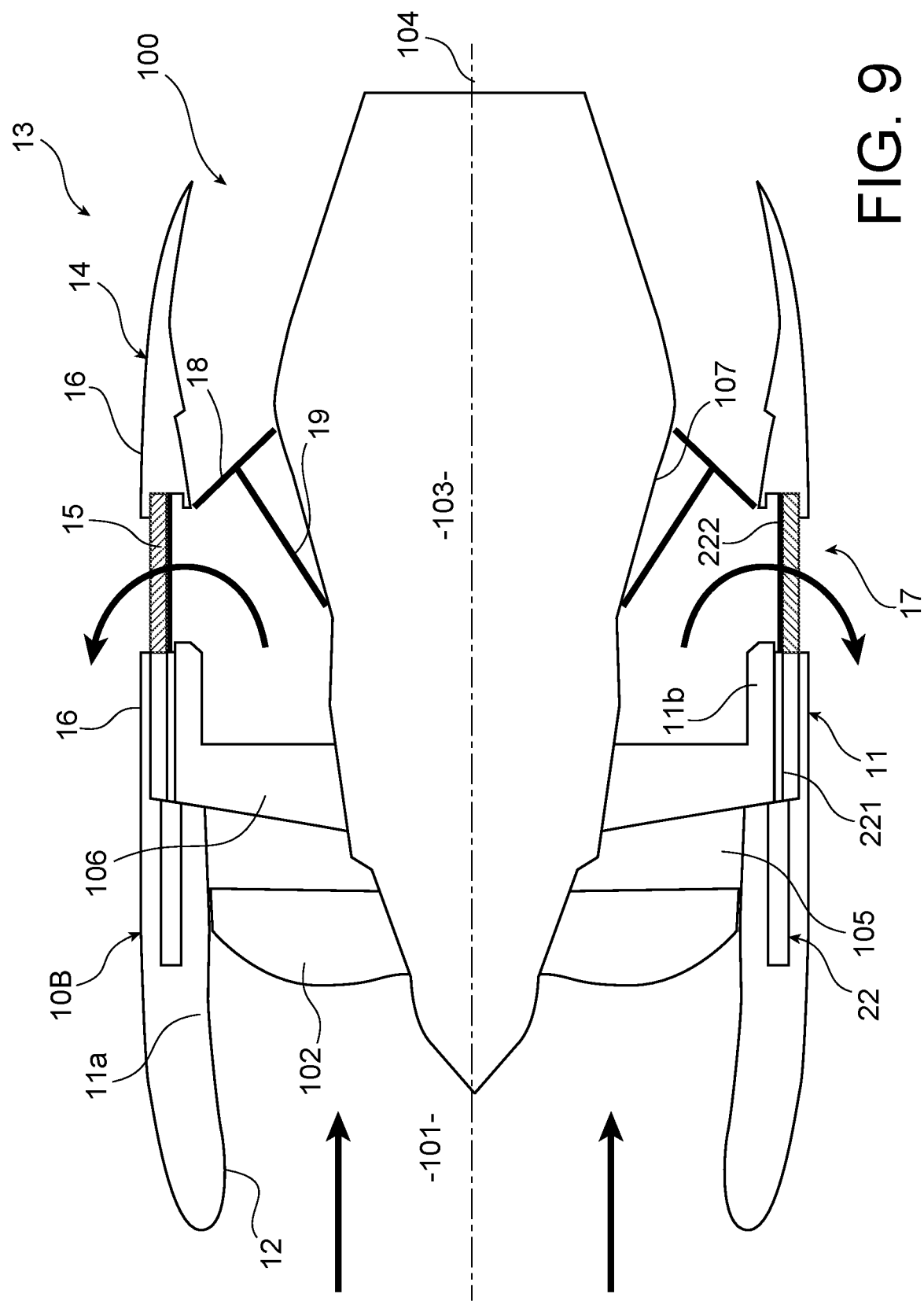
FIG. 9 is a perspective view of the aircraft bypass turbomachine shown in FIG. 8, with the thrust reverser operating in direct jet mode.

The turbomachine 100 comprises, from upstream to downstream in the direction of air flow in the axial direction, a fan 102 and a separation nozzle (not shown) from which emerge an annular primary flow channel (not shown), referred to as the primary flow path, made within a core 103 of the turbomachine 100 extending along an axially oriented longitudinal axis 104, and an annular secondary flow channel 105, referred to as the secondary flow path, surrounding the primary flow path (FIGS. 1 and 8). The primary flow path and the secondary flow path 105 are centred on the longitudinal axis 104. The nacelle 10A, 10B, 10C surrounding the turbomachine 100 comprises an annular air intake lip 101 inside which flows an intake air stream 101 towards the fan 102.

The primary flow path itself comprises, in the upstream to downstream direction, a low-pressure compressor, a high-pressure compressor, a combustion chamber, a high-pressure turbine, a low-pressure turbine and an exhaust nozzle. The secondary flow path 105 comprises a guide vane assembly 106 (FIGS. 1 and 8) including a vane blade for rectifying the stream originating from the fan 102.

The gas stream flowing along each of the primary and secondary flow paths contributes to producing the total thrust of the turbomachine 100.

The turbomachine 100 is further ducted by the nacelle 10A, 10B, 10C, which has an annular shape, extending about the longitudinal axis 104 and surrounding the secondary flow path 105.

The nacelle 10A, 10B, 10C comprises an outer annular envelope 11 extending about the longitudinal axis 104 and forming a continuous outer surface of the nacelle 10A, 10B, 10C. The annular envelope 11 of the nacelle 10A, 10B, 10C is formed by a cowl or by a plurality of assembled cowls, and constitutes a fixed envelope which extends in the upstream to downstream direction from the annular air intake lip 101 to a portion of the annular envelope 11 inside which sliding cascades 15, 23 of a thrust reverser 13 are housed.

The inner surface 12 of the nacelle 10A, 10B, 10C is, for example, formed by a fan casing 11a which surrounds the fan 102 and by an outer shell of an intermediate casing 11b which is located downstream of the fan 102. The annular envelope 11 thus surrounds the fan casing 11a and the intermediate casing 11b. The intermediate casing 11b also supports, for example, the guide vane assembly 106.

The turbomachine 100 has, for example, a high bypass ratio, in particular greater than 10. This by-pass ratio, also known as "BPR", corresponds to the conventional meaning of the term, in particular as defined by the European Aviation Safety Agency (EASA), namely: "The ratio of the air mass flow through the by-pass ducts of a gas turbine engine to the air mass flow through the engine core, calculated at maximum thrust when the engine is stationary in an international standard atmosphere at sea level".

The nacelle 10A, 10B, 10C further comprises a thrust reverser 13, in turn comprising an annular movable cowl 14 extending about the longitudinal axis 104 and located downstream of the annular envelope 11 of the nacelle 10A, 10B, 10C, as well as at least one first thrust-reversing cascade 15. Where appropriate, the movable cowl 14 is also located downstream of the outer shell of the intermediate casing 11*b*.

The movable cowl 14 is capable of moving by sliding relative to the annular envelope 11 which is fixed, along the longitudinal axis 104, between a closed position and an open position.

In the closed position (FIGS. 1, 8 and 15), the movable cowl 14 and the annular envelope 11 jointly define a continuous annular outer surface 16. The term "continuous surface" is understood to mean that, in the closed position, an upstream outer edge of the movable cowl 14 and a downstream outer edge of the annular envelope 11 are in contact with one another along the entire circumference thereof about the longitudinal axis 104.

In the open position (FIGS. 2 to 4 and 10 to 14), the movable cowl 14 and the annular envelope 11 define therebetween a radial opening 17, relative to the longitudinal axis 104, extending circumferentially about the longitudinal axis 104. The outer surface 16 defined by the movable cowl 14 and the annular envelope 11 is thus no longer continuous, the upstream outer edge of the movable cowl 14 and the downstream outer edge of the annular envelope 11 being longitudinally spaced apart from one another, such that they define the opening 17. In the open position, the gas stream from the secondary flow path 105 is exhausted to the outside through the opening 17 formed between the movable cowl 14 of the thrust reverser 13 and the annular envelope 11.

For example, the first cascades 15 of the thrust reverser 13 are evenly distributed about the longitudinal axis 104. Each of the first cascades 15 occupies an angular sector about the longitudinal axis 104.

The first cascades 15 are movable. They are also designed to selectively:

occupy a retracted position, when the movable cowl 14 is in the closed position;

slide relative to the annular envelope 11 along the longitudinal axis 104 from the retracted position into an extended position, when the movable cowl 14 itself slides from the closed position into the open position, and from the extended position into the retracted position, when the movable cowl 14 in turn slides from the open position into the closed position;

occupy the retracted position, when the movable cowl 14 slides between the closed position and the open position.

In the retracted position (FIGS. 1, 4, 5, 8, 9 and 12 to 14), the first cascades 15 are housed inside the annular envelope 11. The annular envelope 11 thus surrounds the first cascades 15. In this manner, no gas stream from the secondary flow path 105 passes through the first cascades 15.

When the movable cowl 14 is in the closed position and the first cascades 15 are in the retracted position, the thrust reverser 13 is in a first state and operates in direct jet mode (FIGS. 1, 8, 9 and 15).

In the extended position (FIGS. 2, 10 and 11), the first cascades 15 are located outside the annular envelope 11 and close off the opening 17 defined between the annular envelope 11 and the movable cowl 14 in the open position. The first cascades 15 extend across said opening 17.

Figure 2:
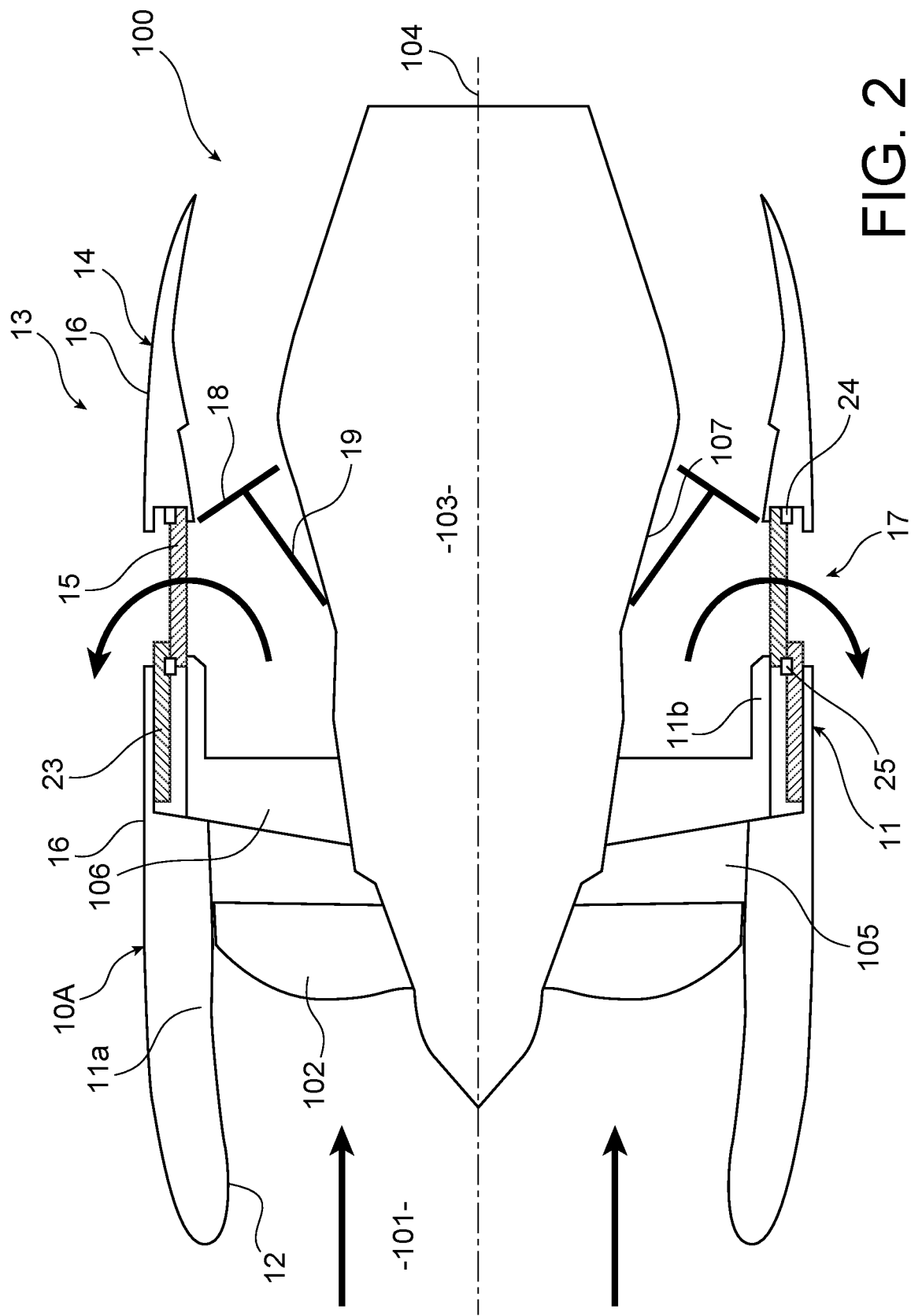
FIG. 2 is a longitudinal sectional view of the bypass turbomachine shown in FIG. 1, with the thrust reverser operating in reverse thrust mode.
Figure 10:
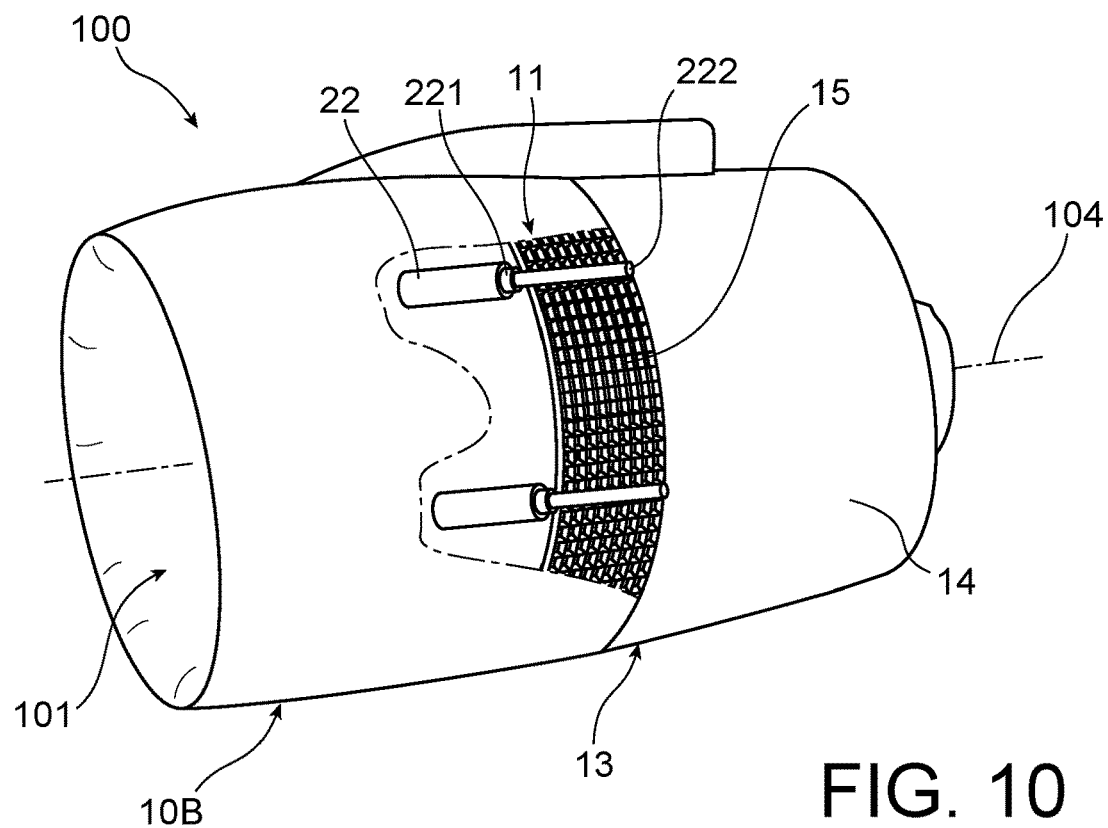
FIG. 10 is a longitudinal sectional view of the bypass turbomachine shown in FIGS. 8 and 9, with the thrust reverser operating in reverse thrust mode.
Figure 11:
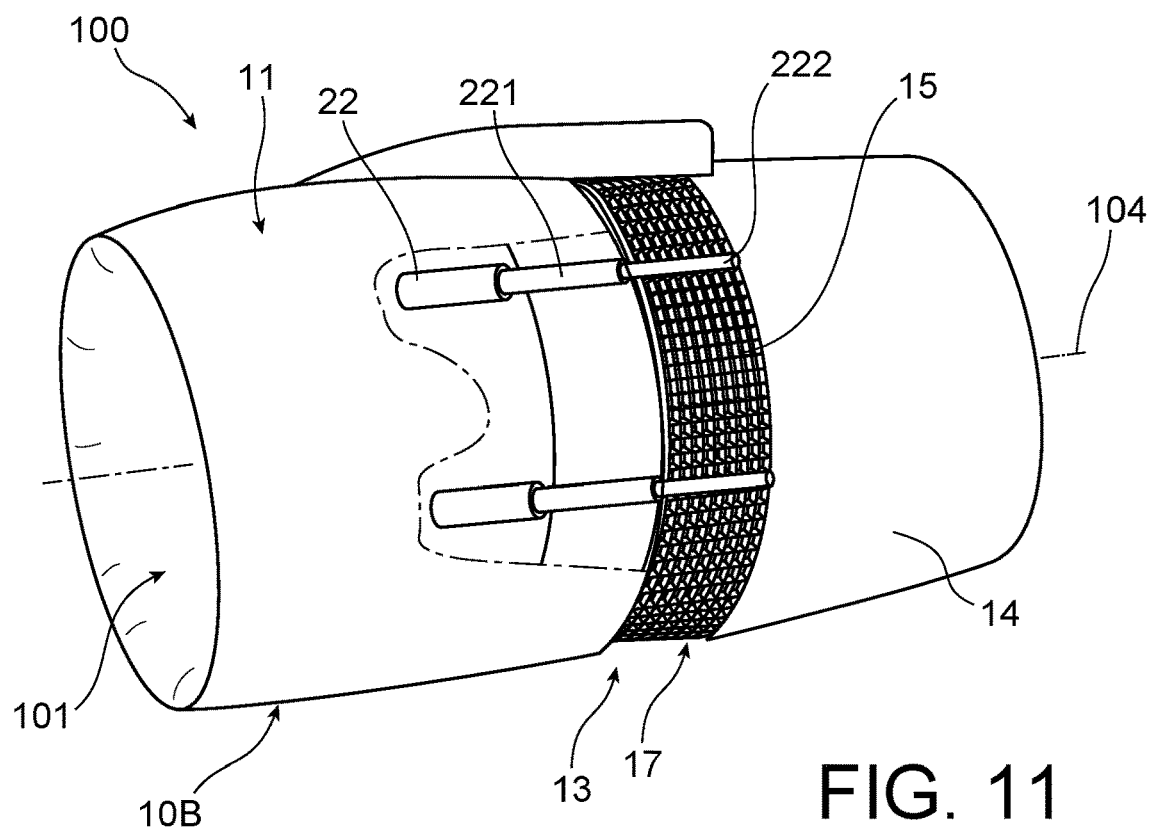
FIG. 11 is a perspective view of the bypass turbomachine shown in FIGS. 8 and 9, with the thrust reverser operating in reverse thrust mode.

When the movable cowl 14 is in the open position and the first cascades 15 are in the extended position, the thrust reverser 13 is in a second state and operates in reverse thrust mode (FIGS. 2, 10 and 11). The gas stream from the secondary flow path 105 is exhausted to the outside through the first cascades 15, which direct said gas stream to upstream of the nacelle 10A, 10B, 10C. Thus, a part of the gas stream from the secondary flow path 105 passes through the first cascades 15 to emerge outside the nacelle 10A, 10B, 10C with a velocity oriented so as to generate a negative thrust along the longitudinal axis 104. In the second state, the thrust reverser 13 thus takes the gas stream flowing along the secondary flow path 105 to produce a counter-thrust or a negative thrust oriented to upstream of the nacelle 10A, 10B, 10C. The term "negative thrust" is understood to mean a propulsive force directed in the opposite direction to the forward motion of the aircraft.

When the thrust reverser 13 is in the second state, the first cascades 15 are thus designed to take the gas stream from the secondary flow path 105 and send said gas stream to the outside and to upstream of the nacelle 10A, 10B, 10C.

For this purpose, the first cascades have vanes forming, for example, a first angle with the longitudinal axis 104 comprised between 110° and 150°, in particular equal to 120°, a radially inner end of the vanes, relative to the longitudinal axis 104, being located downstream, and a radially outer end of the vanes, relative to the longitudinal axis 104, being located upstream. The vanes are thus inclined, from upstream to downstream in the axial direction, from the outside to the inside in the radial direction.

Figure 4:
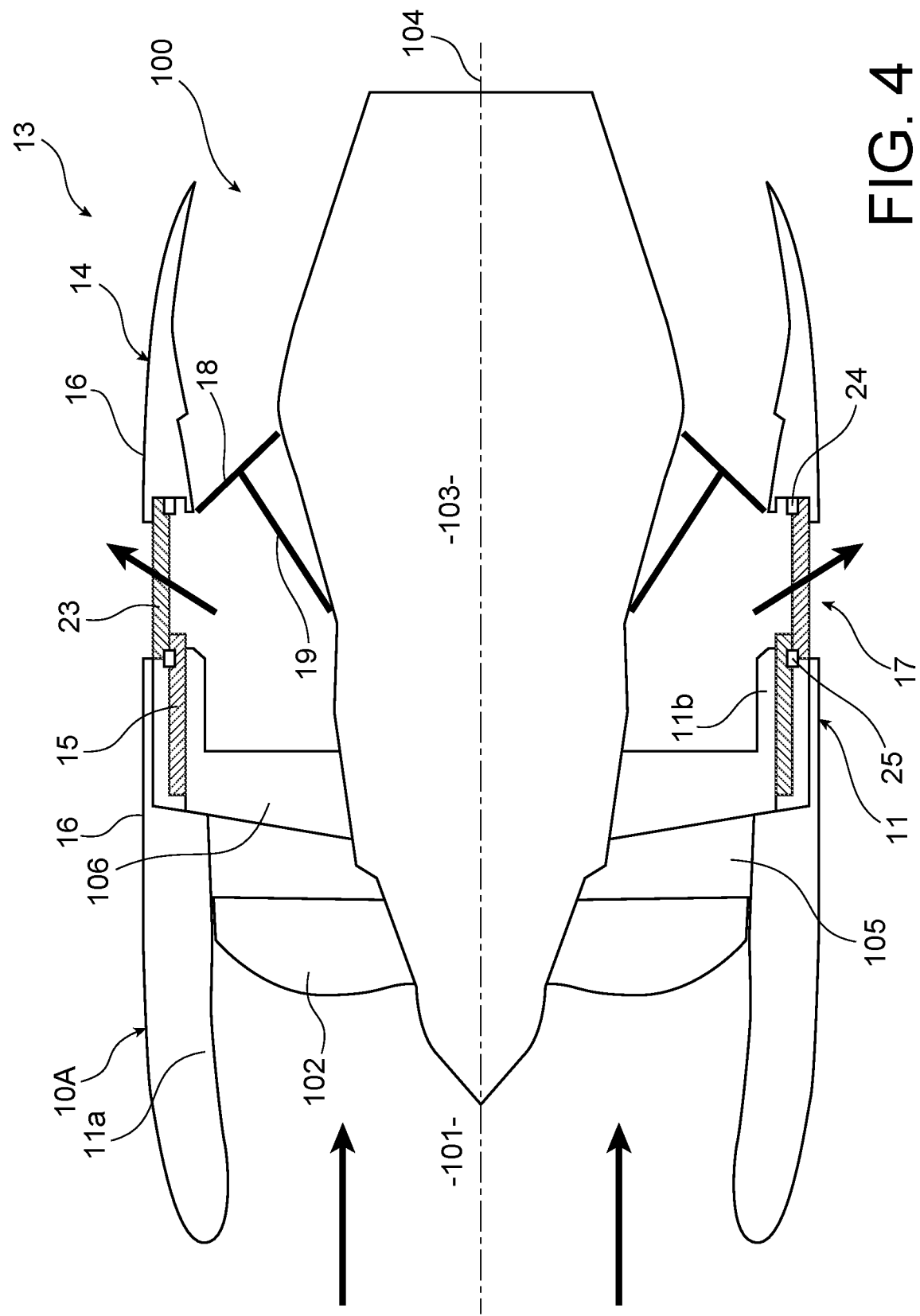
FIG. 4 is a longitudinal sectional view of the bypass turbomachine shown in FIGS. 1 to 3, with the thrust reverser operating in full thrust-cancelling mode.
Figure 13:
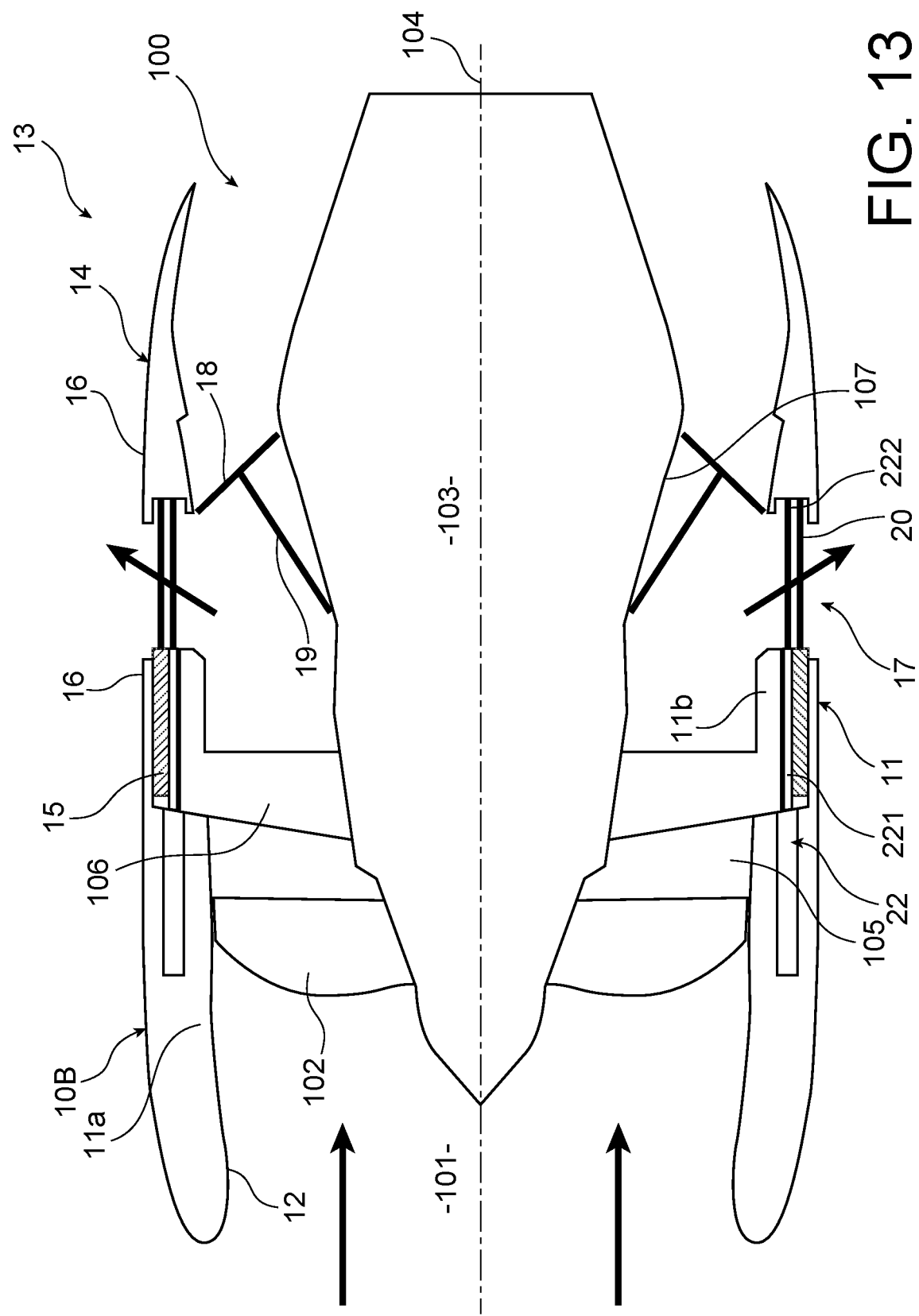
FIG. 13 is a longitudinal sectional view of the bypass turbomachine shown in FIGS. 8 to 12, with the thrust reverser operating in full thrust-cancelling mode.
Figure 14:
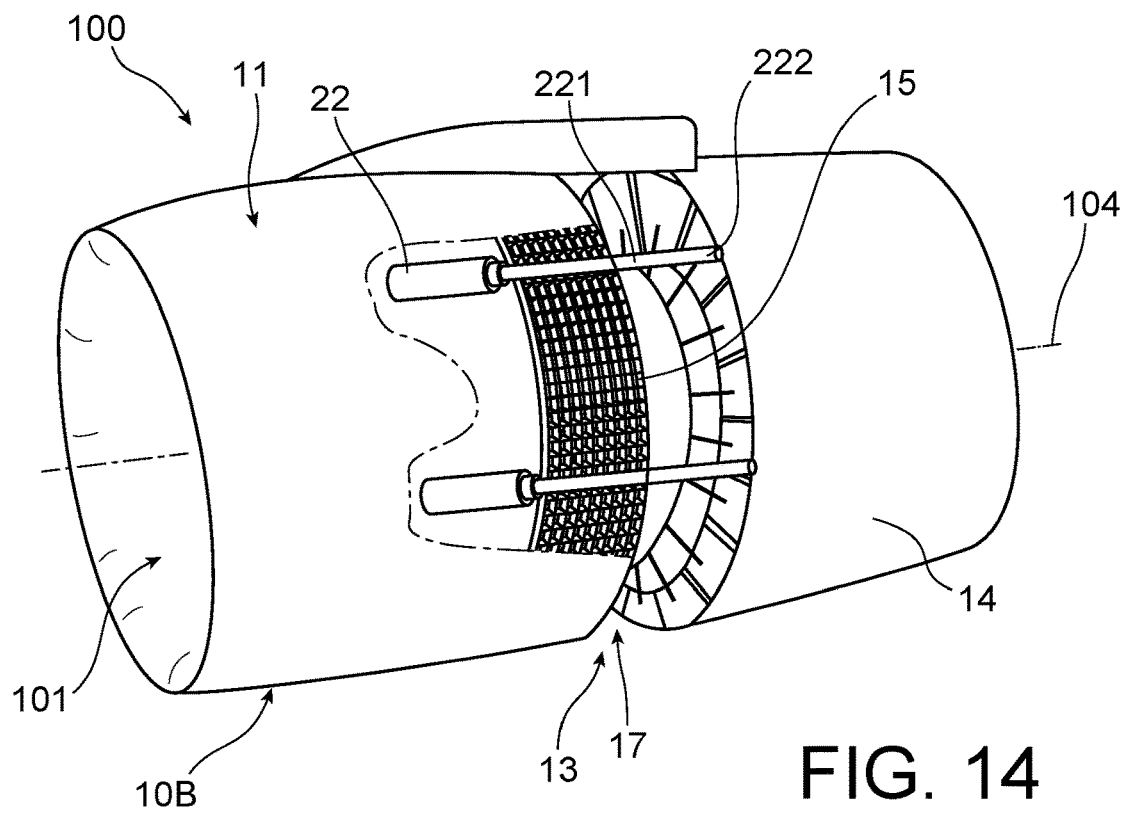
FIG. 14 is a perspective view of the bypass turbomachine shown in FIGS. 8 to 13, with the thrust reverser operating in full thrust-cancelling mode.
Figure 15:
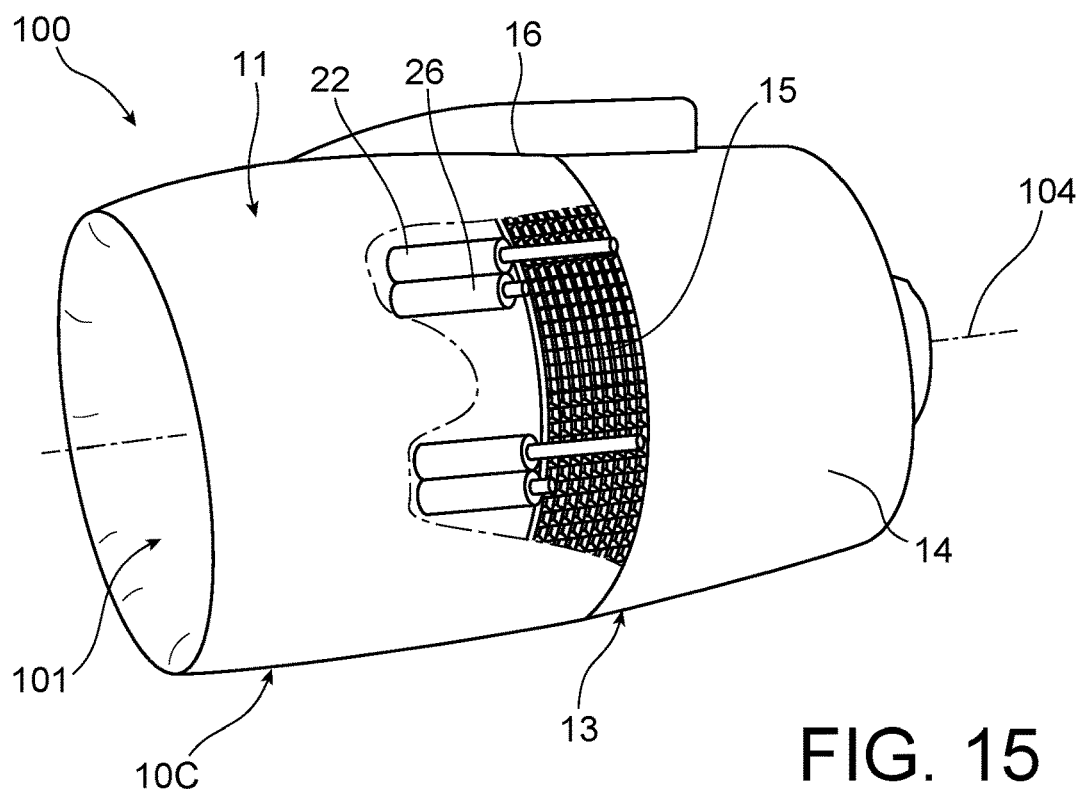
FIG. 15 is a perspective view of an aircraft bypass turbomachine comprising a thrust reverser operating in direct jet mode, according to another embodiment of the invention.

When the movable cowl 14 is in the open position and the first cascades 15 are in the retracted position, the thrust reverser 13 is in a third state and operates in thrust-cancelling mode (FIGS. 4, 13 and 14). This third state corresponds to a thrust-cancelling configuration, which can be total or partial as explained hereinbelow.

When the thrust reverser 13 is in the third state, the gas stream from the secondary flow path 105 is exhausted to the outside via the opening 17 defined between the annular envelope 11 and the movable cowl 14, without being redirected via the first cascades 15 to upstream of the nacelle 10A, 10B, 10C. Thus, in the third state, the thrust reverser 13 takes the gas stream flowing in the secondary flow path 105 in order to dissipate and thus cancel the thrust produced by said gas stream, and not to produce a counter-thrust or a negative thrust.

Figure 12:
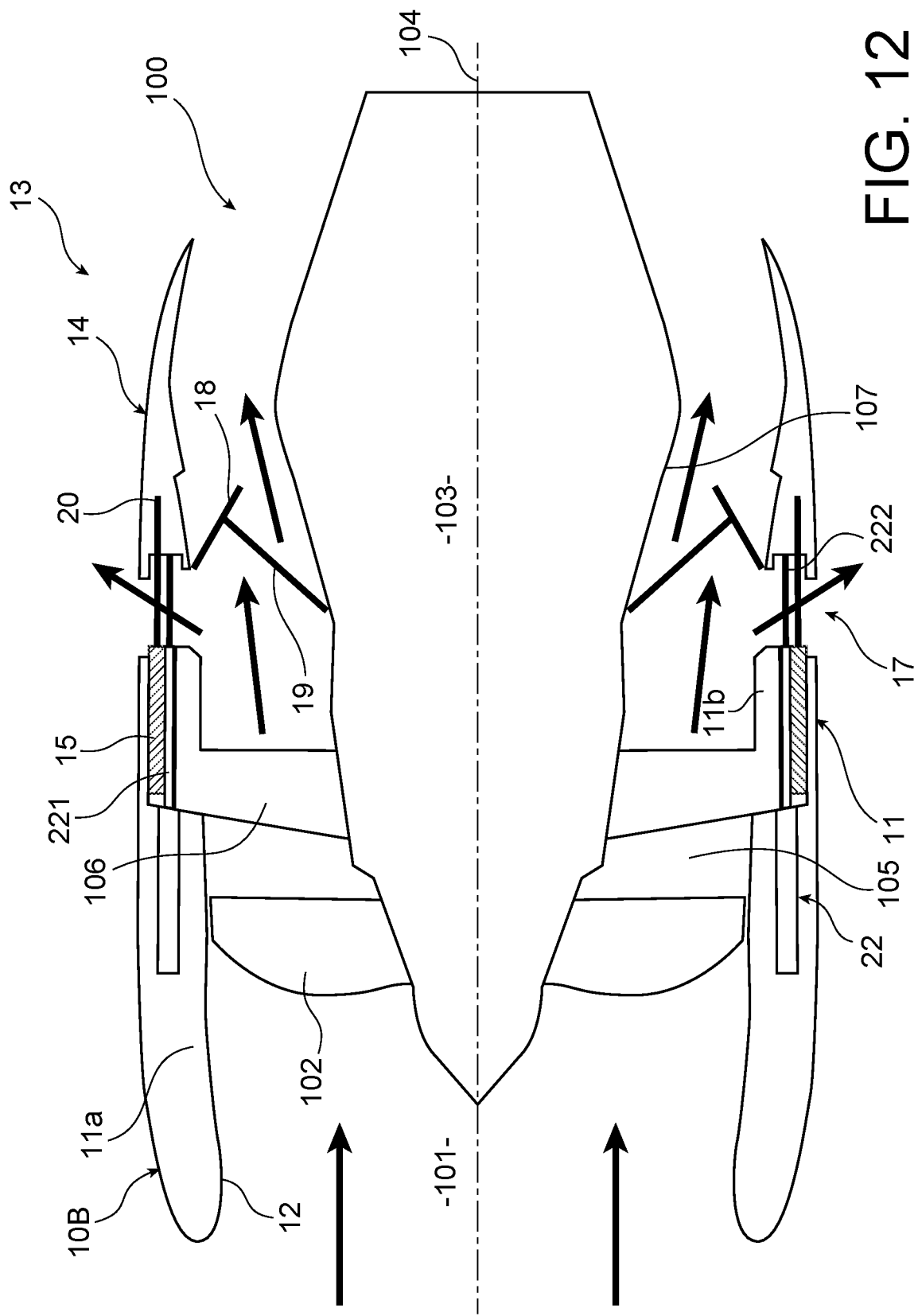
FIG. 12 is a longitudinal sectional view of the bypass turbomachine shown in FIGS. 8 to 11, with the thrust reverser operating in partial thrust-cancelling mode.

In the third state, the opening 17 defined between the annular envelope 11 and the movable cowl 14 is left unblocked for example, such that the gas stream from the secondary flow path 105 passes through the opening 17 to emerge outside the nacelle 10A, 10B, 10C with a velocity that is oriented so as to generate a substantially zero thrust along the longitudinal axis 104 (FIGS. 12, 13 and 14). The gas stream from the secondary flow path 105 is exhausted generally radially to the outside through the opening 17 defined between the annular envelope 11 and the movable cowl 14.

Figure 3:
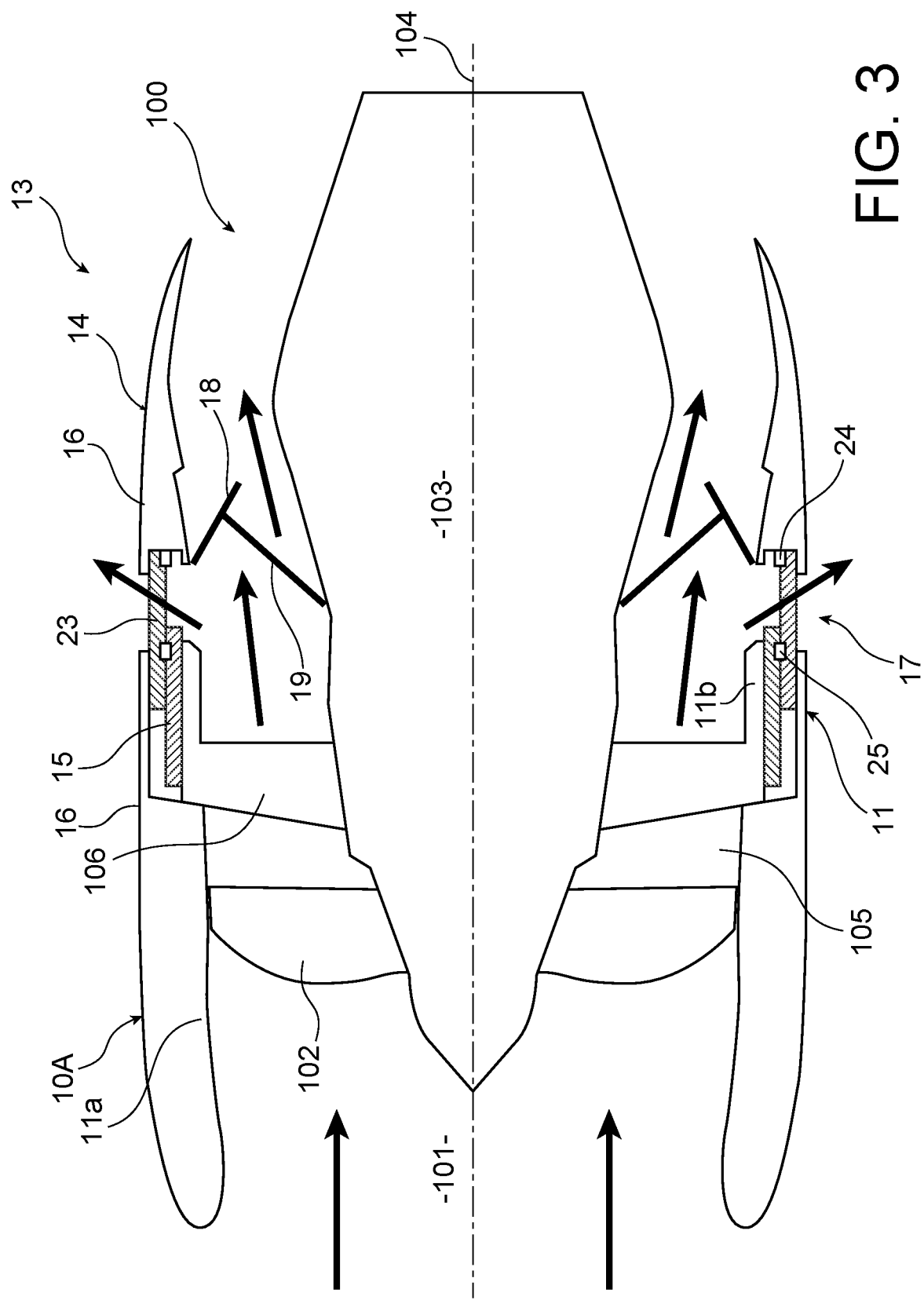
FIG. 3 is a longitudinal sectional view of the bypass turbomachine shown in FIGS. 1 and 2, with the thrust reverser operating in partial thrust-cancelling mode.

Alternatively, the opening 17 can be occupied by at least one second movable thrust-reducing cascade 23, as explained in more detail in the description hereinbelow, such that the gas stream from the secondary flow path 105 passes through the opening 17 to emerge outside the nacelle 10A, 10B, 10C with a velocity that is oriented so as to generate a positive thrust along the longitudinal axis 104 (FIGS. 3 and 4).

The thrust reverser 13 thus only acts on the gas stream flowing along the secondary flow path 105.

In addition to the first, second and third states, the thrust reverser 13 can of course be in any intermediate state between the first and second states as well as any intermediate state between the first and third states, so as to exhaust a smaller part of the gas stream from the secondary flow path 105 to the outside through the opening 17, whether this is closed off or not by the first cascades 15, with the other part of the gas stream escaping axially from the secondary flow path 105 to produce the thrust.

This allows, for example, a thrust reverser 13 to operate in partial thrust-cancelling mode (FIGS. 3 and 12), and not in full thrust-cancelling mode (FIGS. 4, 13 and 14) which corresponds to the third state of the thrust reverser 13. In these two cases, the thrust reverser 13 is in a partial or total thrust-cancelling configuration. In this way, the thrust produced by the gas stream escaping axially from the secondary flow path 105 can be regulated. Partial thrust cancellation is of interest, for example, in order to dissipate an unnecessary part of the thrust produced by the gas stream escaping axially from the secondary flow path 105, during aircraft manoeuvres.

In this way, the thrust reverser 13 can operate in partial or total thrust-cancelling mode under conditions that are not permitted for reverse thrust operation, in order to overcome the difficulties associated with the high thrust produced by the turbomachine 100, which is a bypass turbomachine.

This is the case, for example, in the landing phase, when the aircraft is approaching the ground and is running at idle speed, the thrust reverser 13 of the turbomachines 100 fitted to the aircraft being able to operate in partial thrust-cancelling mode in order to accelerate the aircraft's descent. The same applies in the flight phase, in emergency situations where a rapid descent is required.

This is also the case in the landing phase, when the aircraft has touched down on the runway. The thrust reverser 13 of the turbomachines 100 fitted to the aircraft can operate in partial or total thrust-cancelling mode provided that the aircraft's speed is below a predefined speed limit, for example 60 knots (111.12 km/h), without the risk of re-ingesting the exhaust air stream or ingesting debris from the runway.

This is still the case for ensuring the aircraft remains stationary on the ground or even in the taxiing phase on the runway, the thrust reverser 13 of the turbomachines 100 which equip the aircraft can operate in partial or total thrust-cancelling mode without the risk of re-ingesting the exhausted air stream or of ingesting debris from the runway.

In the descent or landing phase, the operation of the thrust reverser 13 of the turbomachines 100 fitted to the aircraft in partial thrust-cancelling mode also makes it possible to prevent the turbomachines 100 from supplying the aircraft with power which it does not need and which will have to be dissipated in any case when the aircraft is braking on the ground.

Furthermore, since the thrust reverser 13 can operate in partial or total thrust-cancelling mode, the idle speed of the turbomachine 100 can be increased, which on the one hand increases the reliability of the turbomachine 100 and on the other hand makes it easier for the aircraft to obtain the necessary power requirements.

The partial or total thrust-cancelling operation of the thrust reverser 13 of one of the turbomachines 100 fitted to the aircraft can also allow the aircraft to be maneuvered in flight or on the ground, since the total thrust produced by each of the turbomachines 100 is no longer equal. This would also reduce the size of the aircraft's vertical stabiliser.

Conversely, in flight, when the total thrust produced by each of the turbomachines is not equal, the partial or total thrust-cancelling operation of the thrust reverser 13 of one of the turbomachines 100 fitted to the aircraft can allow the total thrust produced by each of the turbomachines 100 to be rebalanced.

Operation of the thrust reverser 13 in partial or total thrust-cancelling mode is also less restrictive in terms of certifications than operation in reverse thrust mode.

The thrust reverser 13 further comprises at least one reverser door 18.

The reverser doors 18 are designed to move from a retracted position into a deployed position as the movable cowl 14 slides from the closed position into the open position.

In the first state of the thrust reverser 13, when the thrust reverser 13 is operating in direct jet mode, the reverser doors 18 are in the retracted position (FIGS. 1, 8, 9 and 15). In the second and third states of the thrust reverser 13, when the thrust reverser 13 is operating in reverse thrust or thrust-cancelling mode, the reverser doors 18 are in the deployed position (FIGS. 2, 4, 10, 11, 13 and 14).

In the retracted position, the reverser doors 18 axially unblock the secondary flow path 105. The reverser doors 18 are, for example, housed in the movable cowl 14. The gas stream thus flows from upstream to downstream along the secondary flow path 105 and axially escapes therefrom.

In the deployed position, the reverser doors 18 are arranged in the secondary flow path 105 and axially block the secondary flow path 108, in particular downstream of the guide vane assembly 106. The reverser doors 18 thus close off the secondary flow path 105 and prevent the gas stream flowing along the secondary flow path 105 from axially escaping therefrom. The reverser doors 18 thus enhance the exhausting of the gas stream from the secondary flow path 105 through the opening 17 defined between the annular envelope 11 and the movable cowl 14 in the open position.

The reverser doors 18 are, for example, caused to move between the retracted position and the deployed position, by the movable cowl 14 as it slides between the closed position and the open position.

For this purpose, the reverser doors 18 can each be mounted on the movable cowl 14 such that they pivot about a circumferentially-oriented pivot axis (not shown) between the retracted position and the deployed position. The reverser doors 18 can furthermore be guided by connecting rods 19, which are pivotally mounted, such that the reverser doors 18 pivot about circumferentially-oriented pivot axes (not shown) on the one hand on the reverser doors 18, and on the other hand on an annular inner shell 107 of the turbomachine 100, which extends about the longitudinal axis 104 and which is surrounded by the secondary flow path 105 and by the nacelle 10A, 10B, 10C.

The thrust reverser 13 can further comprise at least one guide member 20 supported by the annular envelope 11 and designed to guide the first cascades 15 such that they slide along the longitudinal axis 104 between the retracted and extended positions (FIGS. 5, 6, 7, 10, 12 and 13).

For this purpose, the guide members 20 are each formed by an axial rail, oriented parallel to the longitudinal axis 104. The rails 20 are furthermore evenly distributed about the longitudinal axis 104.

Each first cascade 15 is guided, for example, at each of the circumferential ends thereof, by a rail 20.

Moreover, each rail 20 is, for example, intended to guide the adjacent circumferential ends of two first cascades 15, whereby a rail 20 is thus sandwiched between two circumferentially-adjacent first cascades 15.

The thrust reverser 13 further comprises an actuating mechanism designed to selectively:
  move the movable cowl 14 and the first cascades 15 by sliding along the longitudinal axis 104 on the one hand respectively from the closed position into the open position and from the retracted position into the extended position, and on the other hand from the open position into the closed position and from the extended position into the retracted position;

hold the first cascades 15 in the retracted position and move the movable cowl 14 by sliding along the longitudinal axis 104 between the closed position and the open position.

The actuating mechanism thus allows the thrust reverser 13 to be operated selectively in reverse thrust mode (FIGS. 2, 10 and 11) or in full or partial thrust-cancelling mode (FIGS. 3, 4, 12, 13 and 14).

The actuating mechanism of the thrust reverser 13 comprises, for example, at least one first actuator 22 designed to cause the movable cowl 14 to slide along the longitudinal axis 104 between the closed position and the open position (FIGS. 8 to 14 and 15).

The first actuators 22 are, for example, supported by the annular envelope 11.

The first actuators 22 comprise, for example, cylinders that extend axially and that are evenly distributed about the longitudinal axis 104.

The cylinders of the first actuators 22 can be hydraulic, pneumatic or electric.

According to a first embodiment of the invention (not shown), the opening 17 defined between the annular envelope 11 and the movable cowl 14 is left unblocked in the third state of the thrust reverser 13 and the actuating mechanism further comprises at least one first blocking member designed to block the first cascades 15 from sliding relative to the movable cowl 14 along the longitudinal axis 104, in a first blocking position, and to unblock the first cascades 15 such that they can slide relative to the movable cowl 14 along the longitudinal axis 104, in a second blocking position.

In this way, when the first blocking members are in the first blocking position, the first cascades 15 slide as one piece with the movable cowl 14 along the longitudinal axis 104. Thus, when the first actuators 22 cause the movable cowl 14 to slide from the closed position into the open position, the movable cowl 14 in turn causes the first cascades 15 to slide from the retracted position into the extended position. This allows the thrust reverser 13 to switch from the first to the second state, and thus to operate in reverse thrust mode.

By contrast, when the first blocking members are in the second blocking position, the movable cowl 14 and the first cascades 15 are free to slide relative to one another along the longitudinal axis 104. Thus, when the first actuators 22 cause the movable cowl 14 to slide from the closed position into the open position, the first cascades 15 can remain in the retracted position. This allows the thrust reverser 13 to switch from the first to the third state, and thus to operate in thrust-cancelling mode.

For example, a pair of first blocking members is provided for each first cascade 15 in order to block, in the first blocking position, said first cascade 15 relative to the movable cowl 14 at each of the two circumferential ends thereof.

For example, each of the first blocking members comprises a body supported by the movable cowl 14 and a finger mounted such that it slides relative to the body along a sliding axis, oriented radially relative to the longitudinal axis 104, between the first blocking position and the second blocking position.

In the first blocking position, the finger is engaged in an opening which is coaxial with the sliding axis and which is formed in the first cascade 15.

In the second blocking position, the finger unblocks the opening of the first cascade 15.

The first blocking members are, for example, hydraulically, pneumatically, electrically or magnetically actuated. The first blocking members can also be mechanically actuated by means of a cable or a ring connected to each of the first blocking members.

The actuating mechanism further comprises, for example, at least one second blocking member designed to unblock the first cascades 15 such that they can slide relative to the annular envelope 11 along the longitudinal axis 104, in a third blocking position, and to block the first cascades 15 from sliding relative to the annular envelope 11 along the longitudinal axis 104, the first cascades 15 being in the retracted position, in a fourth blocking position.

In this way, when the second blocking members are in the third blocking position, the first cascades 15 are free to slide relative to the annular envelope 11 along the longitudinal axis 104. Thus, when the first blocking members are in the first blocking position and when the first actuators 22 cause the movable cowl 14 to slide from the closed position into the open position, the movable cowl 14 in turn causes the first cascades 15 to slide from the retracted position into the extended position. This allows the thrust reverser 13 to switch from the first to the second state, and thus to operate in reverse thrust mode.

By contrast, when the second blocking members are in the fourth blocking position, the first cascades 15 are fixed relative to the annular envelope 11 and in the retracted position. Thus, when the first blocking members are in the second blocking position and when the first actuators 22 cause the movable cowl 14 to slide between the closed position and the open position, the first cascades 15 are held in the retracted position. This allows the thrust reverser 13 to switch from the first to the third state, and thus to operate in thrust-cancelling mode.

For example, a pair of second blocking members is provided for each first cascade 15 in order to block, in the fourth blocking position, said first cascade 15 relative to the annular envelope 11 at each of the two circumferential ends thereof.

For example, each of the second blocking members comprises a body supported by the annular envelope 11, in particular by one of the rails 20, and a finger mounted such that it slides relative to the body along a sliding axis, oriented radially relative to the longitudinal axis 104, between the third blocking position and the fourth blocking position.

In the third blocking position, the finger unblocks an opening which is coaxial with the sliding axis and which is formed in the first cascade 15 guided by the rail 20, in particular in the circumferential end thereof guided by the rail 20.

In the fourth blocking position, the finger is engaged in the opening of the first cascade 15 which is guided by the rail 20, in particular in the circumferential end thereof guided by the rail 20.

The second blocking members are, for example, hydraulically, pneumatically, electrically or magnetically actuated. The second blocking members can also be mechanically actuated by means of a cable or a ring connected to each of the second blocking members.

Thus, according to the first embodiment, when the thrust reverser 13 is operating in reverse thrust mode, the first actuators 22 cause the movable cowl 14 to slide from the closed position into the open position, the movable cowl 14 in turn causing, on the one hand, the first cascades 15 to slide from the retracted position into the extended position, where the first blocking members are in the first blocking position, and, on the other hand, the reverser doors 18 to pivot from the retracted position into the deployed position. When the movable cowl 14 reaches the open position, when the first cascades 15 reach the extended position and when the reverser doors 18 reach the deployed position, the thrust reverser 13 is in the second state and the gas stream flowing along the secondary flow path 105 blocked by the reverser doors 18 is exhausted to the outside through the first cascades 15 in the extended position which direct said gas stream to upstream of the nacelle, thus producing a counter-thrust oriented to upstream of the nacelle.

When the thrust reverser 13 is operating in full or partial thrust-cancelling mode, the first actuators 22 cause the movable cowl 14 to slide from the closed position into the open position, the movable cowl 14 in turn causing the reverser doors 18 to pivot from the retracted position to the deployed position, whereas the first cascades 15 are held in the retracted position by the second blocking members in the fourth blocking position. When the movable cowl 14 reaches the open position and when the reverser doors 18 reach the deployed position, with the first cascades 15 remaining in the retracted position, the thrust reverser 13 is in the third state and the gas stream flowing along the secondary flow path 105 blocked by the reverser doors 18 is exhausted to the outside generally radially through the opening 17 defined between the annular envelope 11 and the movable cowl 14 in the open position, producing practically no thrust or counter-thrust. In other words, the thrust produced is substantially zero.

According to a second embodiment of the invention shown in FIGS. 1 to 7, the thrust reverser 13 further comprises at least one second thrust-reducing cascade 23, which occupies the opening 17 defined between the annular envelope 11 and the movable cowl 14 in the third state of the thrust reverser 13.

For example, the second cascades 23 are evenly distributed about the longitudinal axis 104. Each of the second cascades 23 occupies an angular sector about the longitudinal axis 104.

The thrust reverser 13 comprises, for example, the same number of first and second cascades 15, 23.

The second cascades 23 are movable. They are also designed to selectively:
occupy a retracted position, when the movable cowl 14 is in the closed position;
occupy the retracted position, when the movable cowl 14 and the first cascades 15 slide respectively between the closed and open positions and the retracted and extended positions; and
slide relative to the annular envelope 11 along the longitudinal axis 104 from the retracted position into an extended position, when the first cascades 15 are in the retracted position and when the movable cowl 14 slides from the closed position into the open position, and from the extended position into the retracted position, when the first cascades 15 are in the retracted position and when the movable cowl 14 slides from the open position into the closed position.

In the retracted position (FIGS. 1 and 2), the second cascades 23 are housed in the annular envelope 11, which surrounds them, and are radially superimposed relative to the longitudinal axis 104 with the first cascades 15. No gas stream from the secondary flow path 105 thus passes through the second cascades 23.

When the movable cowl 14 is in the closed position, when the first cascades 15 are in the retracted position, and when the second cascades 23 are in the retracted position, the thrust reverser 13 is in the first state and operates in direct jet mode (FIG. 1).

When the movable cowl 14 is in the open position, when the first cascades 15 are in the extended position, and when the second cascades 23 are in the retracted position, the thrust reverser 13 is in the second state and operates in reverse thrust mode (FIG. 2).

In the extended position (FIG. 4), the second cascades 23 are located outside the annular envelope 11 and close off the opening 17 defined between the annular envelope 11 and the movable cowl 14 in the open position. The second cascades 23 thus extend across said opening 17.

When the movable cowl 14 is in the open position, when the first cascades 15 are in the retracted position, and when the second cascades 23 are in the extended position, the thrust reverser 13 is in the third state and operates in thrust-cancelling mode (FIG. 4). The gas stream from the secondary flow path 105 is exhausted to the outside through the second cascades 23, which direct said gas stream to downstream of the nacelle 10A. Thus, the gas stream from the secondary flow path 105 passes through the opening 17 and emerges outside the nacelle 10B with a velocity oriented so as to generate a positive thrust along the longitudinal axis 104. In the third state, the thrust reverser 13 thus takes the gas stream flowing in the secondary flow path 105 in order to cancel the thrust produced by said gas stream, and not to produce a counter-thrust. The term "positive thrust" is understood to mean a propulsive force directed in the same direction as the forward motion of the aircraft.

When the thrust reverser 13 is in the third state, the second cascades 23 are thus designed to take the gas stream from the secondary flow path 105 and send said gas stream to the outside and to downstream of the nacelle 10A.

For this purpose, the second cascades 23 have vanes forming a second angle with the longitudinal axis 104 comprised between 30° and 60°, in particular equal to 45°, a radially inner end of the vanes, relative to the longitudinal axis 104, being located upstream, and a radially outer end of the vanes, relative to the longitudinal axis 104, being located downstream. The vanes are thus inclined, from upstream to downstream in the axial direction, from the inside to the outside in the radial direction.

The second cascades 23 are, for example, arranged radially outside the first cascades 15 relative to the longitudinal axis 104. When the thrust reverser is in the first state (FIG. 1), the second cascades 23 are, for example, radially sandwiched, relative to the longitudinal axis 104, between the annular envelope 11 and the first cascades 15. This contributes to separating the gas stream that is exhausted through the second cascades 23 and thus produces disturbances in the gas stream which are conducive to cancelling the thrust of the turbomachine 100.

Figure 5:
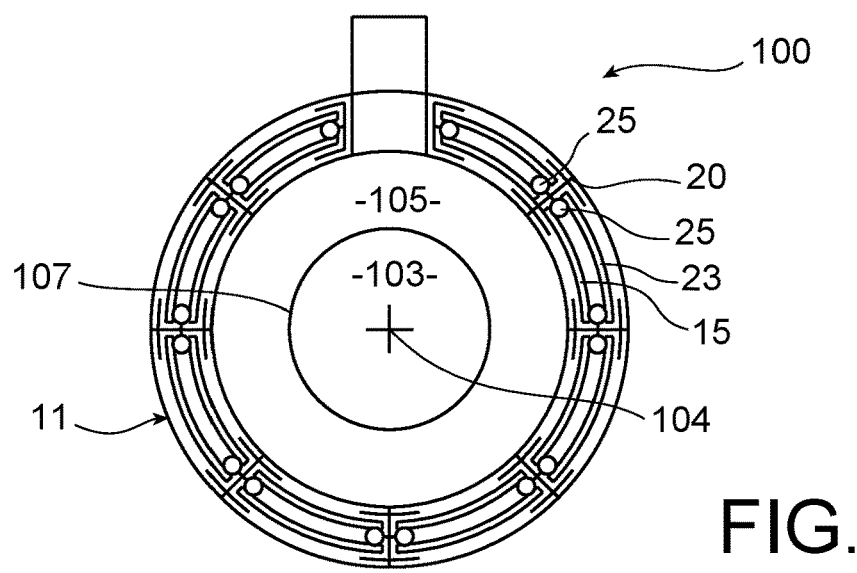
FIG. 5 is a view of the bypass turbomachine shown in FIG. 1 along the cross-sectional plane A-A.
Figure 6:
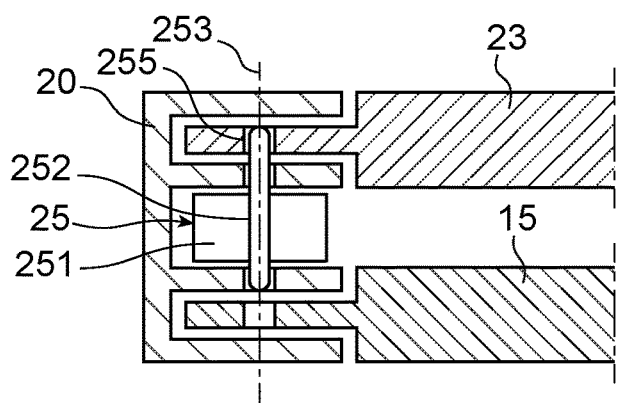
FIG. 6 is a detailed, longitudinal sectional view of the thrust reverser shown in FIGS. 1 to 4, with second blocking members in the third blocking position.
Figure 7:
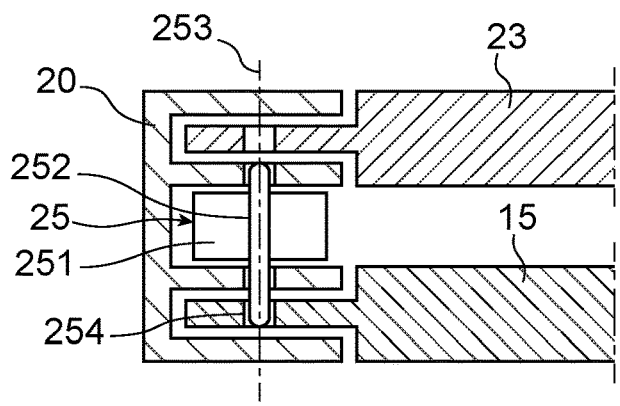
FIG. 7 is a detailed, longitudinal sectional view of the thrust reverser shown in FIGS. 1 to 4, with the second blocking members in the fourth blocking position.

The guide members 20 are designed, for example, to guide the first cascades 15 such that they slide along the longitudinal axis 104 between the retracted and extended positions on the one hand, and the second cascades 23 such that they slide along the longitudinal axis 104 between the retracted and extended positions on the other hand (FIGS. 5, 6 and 7).

For this purpose, the guide members 20 are each formed by an axial rail, oriented parallel to the longitudinal axis 104. The rails 20 are furthermore evenly distributed about the longitudinal axis 104.

Each pair of superimposed first and second cascades 15, 23 is guided by the same rail 20 for example.

Furthermore, each rail 20 is, for example, intended to guide, on the one hand the adjacent circumferential ends of two first cascades 15, and on the other hand the adjacent circumferential ends of two second cascades 23 superimposed with said first cascades 15, a rail 20 thus being sandwiched between each pair of circumferentially adjacent and superimposed first and second cascades 15, 23.

According to the second embodiment, the actuating mechanism is designed to selectively:
  hold the second cascades 23 in the retracted position and move the movable cowl 14 and the first cascades 15 by sliding along the longitudinal axis 104 on the one hand respectively from the closed position into the open position and from the retracted position into the extended position, and on the other hand respectively from the open position into the closed position and from the extended position into the retracted position;
  hold the first cascades 15 in the retracted position and move the movable cowl 14 and the second cascades 23 by sliding along the longitudinal axis 104 on the one hand respectively from the closed position into the open position and from the retracted position into the extended position, and on the other hand respectively from the open position into the closed position and from the extended position into the retracted position.

The actuating mechanism thus allows the thrust reverser 13 to be operated selectively in reverse thrust mode (FIG. 2) or in thrust-cancelling mode (FIG. 4).

The actuating mechanism further comprises at least one first blocking member 24 designed to:
  on the one hand block the first cascades 15 from sliding relative to the movable cowl 14 along the longitudinal axis 104, in a first blocking position (FIG. 2), and unblock the first cascades 15 such that they can slide relative to the movable cowl 14 along the longitudinal axis 104, in a second blocking position (FIGS. 3 and 4); and
  on the other hand, unblock the second cascades 23 such that they can slide relative to the movable cowl 14 along the longitudinal axis 104, in the first blocking position (FIG. 2), and block the second cascades 23 from sliding relative to the movable cowl 14 along the longitudinal axis 104, in the second blocking position (FIGS. 3 and 4).

In this way, when the first blocking members 24 are in the first blocking position (FIG. 2), the first cascades 15 slide as one piece with the movable cowl 14 along the longitudinal axis 104, whereas the movable cowl 14 and the second cascades 23 are free to slide relative to one another along the longitudinal axis 104. Thus, when the first actuators 22 cause the movable cowl 14 to slide from the closed position into the open position, the movable cowl 14 in turn causes the first cascades 15 to slide from the retracted position into the extended position, the second cascades 23 being capable of remaining in the retracted position. This allows the thrust reverser 13 to switch from the first to the second state, and thus to operate in reverse thrust mode.

By contrast, when the first blocking members 24 are in the second blocking position (FIGS. 3 and 4), the movable cowl 14 and the first cascades 15 are free to slide relative to one another along the longitudinal axis 104, whereas the second cascades 23 slide as one piece with the movable cowl 14 along the longitudinal axis 104. Thus, when the first actuators 22 cause the movable cowl 14 to slide from the closed position into the open position, the movable cowl 14 in turn causes the second cascades 23 to slide from the retracted position into the extended position, the first cascades 15 being capable of remaining in the retracted position. This allows the thrust reverser 13 to switch from the first to the third state, and thus to operate in thrust-cancelling mode.

A pair of first blocking members 24 is, for example, provided for each pair of superimposed first and second cascades 15, 23 in order to block said first cascade 15 relative to the movable cowl 14 in a first blocking position, on the one hand, and said second cascade 23 relative to the movable cowl 14 in a second blocking position on the other hand.

For example, each of the first blocking members 24 comprises a body supported by the movable cowl 14 and a finger mounted such that it slides relative to the body along a sliding axis, oriented radially relative to the longitudinal axis 104, between the first blocking position and the second blocking position.

In the first blocking position, the finger is engaged in an opening which is coaxial with the sliding axis and which is formed in the first cascade 15, and unblocks an opening which is coaxial with the sliding axis and which is formed in the second cascade 23.

In the second blocking position, the finger is engaged in the opening of the second cascade 23, and unblocks the opening of the first cascade 15.

The first blocking members 24 are, for example, hydraulically, pneumatically, electrically or magnetically actuated. The first blocking members 24 can also be mechanically actuated by means of a cable or a ring connected to each of the first blocking members 24.

The actuating mechanism further comprises, for example, at least one second blocking member 25 designed to:
  on the one hand, unblock the first cascades 15 such that they can slide relative to the annular envelope 11 along the longitudinal axis 104, in a third blocking position (FIGS. 2 and 6), and block the first cascades 15 from sliding relative to the annular envelope 11 along the longitudinal axis 104, the first cascades 15 being in the retracted position, in a fourth blocking position (FIGS. 3, 4 and 7);
  on the other hand, block the second cascades 23 from sliding relative to the annular envelope 11 along the longitudinal axis 104, the second cascades 23 being in the retracted position, in the third blocking position (FIGS. 2 and 6), and unblock the second cascades 23 such that they can slide relative to the annular envelope 11 along the longitudinal axis 104, in the fourth blocking position (FIGS. 3, 4 and 7).

In this manner, when the second blocking members 25 are in the third blocking position (FIGS. 2 and 6), the first cascades 15 are free to slide relative to the annular envelope 11 along the longitudinal axis 104, whereas the second cascades 23 are fixed relative to the annular envelope 11 and in the retracted position. Thus, when the first blocking members 24 are in the first blocking position and when the first actuators 22 cause the movable cowl 14 to slide from the closed position into the open position, the movable cowl 14 in turn causes the first cascades 15 to slide from the retracted position into the extended position, the second cascades 23 being held in the retracted position. This allows the thrust reverser 13 to switch from the first to the second state, and thus to operate in reverse thrust mode.

By contrast, when the second blocking members 25 are in the fourth blocking position (FIGS. 3, 4 and 7), the first cascades 15 are fixed relative to the annular envelope 11 and in the retracted position, whereas the second cascades 23 are free to slide relative to the annular envelope 11 along the longitudinal axis 104. Thus, when the first blocking members 24 are in the second blocking position and when the first actuators 22 cause the movable cowl 14 to slide from the closed position into the open position, the movable cowl 14 in turn causes the second cascades 23 to slide from the retracted position into the extended position, the first cascades 15 being held in the retracted position. This allows the thrust reverser 13 to switch from the first to the third state, and thus to operate in thrust-cancelling mode.

A pair of second blocking members 25 is, for example, provided for each pair of superimposed first and second cascades 15, 23 in order to block said second cascade 23 relative to the annular envelope 11 at each of the two circumferential ends thereof, in a third blocking position, on the one hand, and said first cascade 15 relative to the annular envelope 11 at each of the two circumferential ends thereof, in a fourth blocking position (FIG. 5), on the other hand.

For example, each of the second blocking members 25 comprises a body 251 supported by the annular envelope 11, in particular by one of the rails 20, and a finger 252 mounted such that it slides relative to the body 251 along a sliding axis 253, oriented radially relative to the longitudinal axis 104, between the third blocking position and the fourth blocking position (FIGS. 6 and 7).

In the third blocking position (FIG. 6), the finger 252 is engaged in an opening 254 which is coaxial with the sliding axis 253 and which is formed in the second cascade 23 guided by the rail 20, in particular in the circumferential end thereof guided by the rail 20. The finger 252 also unblocks an opening 255 which is coaxial with the sliding axis 253 and which is formed in the first cascade 15 guided by the rail 20, in particular in the circumferential end thereof guided by the rail 20.

In the fourth blocking position (FIG. 7), the finger 252 is engaged in the opening 255 of the first cascade 15 guided by the rail 20. The finger 252 also unblocks the opening 254 of the second cascade 23 guided by the rail 20.

The second blocking members 25 are, for example, hydraulically, pneumatically, electrically or magnetically actuated. The second blocking members 25 can also be mechanically actuated by means of a cable or a ring connected to each of the second blocking members 25.

Thus, according to the second embodiment, when the thrust reverser 13 is operating in reverse thrust mode (FIG. 2), the first actuators 22 cause the movable cowl 14 to slide from the closed position into the open position, the movable cowl 14 in turn causing, on the one hand, the first cascades 15 to slide from the retracted position into the extended position, where the first blocking members 24 are in the first blocking position, and, on the other hand, the reverser doors 18 to pivot from the retracted position into the deployed position, whereas the second cascades 23 are held in the retracted position by the second blocking members 25 in the third blocking position. When the movable cowl 14 reaches the open position, when the first cascades 15 reach the extended position and when the reverser doors 18 reach the deployed position, with the second cascades 23 remaining in the retracted position, the thrust reverser 13 is in the second state and the gas stream flowing along the secondary flow path 105 blocked by the reverser doors 18 is exhausted to the outside through the first cascades 15 in the extended position which direct said gas stream to upstream of the nacelle 10A, thus producing a counter-thrust oriented to upstream of the nacelle 10A.

When the thrust reverser 13 is operating in thrust-cancelling mode (FIG. 4), the first actuators 22 cause the movable cowl 14 to slide from the closed position into the open position, the movable cowl 14 in turn causing, on the one hand, the second cascades 23 to slide from the retracted position into the extended position, with the first blocking members 24 being in the second blocking position, and on the other hand the reverser doors 18 to pivot from the retracted position into the deployed position, whereas the first cascades 15 are held in the retracted position by the second blocking members in the fourth blocking position. When the movable cowl 14 reaches the open position, when the second cascades 23 reach the extended position and when the reverser doors 18 reach the deployed position, with the first cascades 15 remaining in the retracted position, the thrust reverser 13 is in the third state and the gas stream flowing along the secondary flow path 105 blocked by the reverser doors 18 is exhausted to the outside through the second cascades 23 in the extended position which orients said gas stream to downstream of the nacelle 10A, thus producing a positive thrust.

According to a third embodiment shown in FIGS. 8 to 14, the opening 17 defined between the annular envelope 11 and the movable cowl 14 is left unblocked in the third state of the thrust reverser 13 and the first actuators 22 are designed to selectively:

cause the movable cowl 14 and the first cascades 15 to slide together along the longitudinal axis 104 on the one hand respectively from the closed position into the open position and from the retracted position into the extended position, and on the other hand from the open position into the closed position and from the extended position into the retracted position;

hold the first cascades 15 in the retracted position and cause the movable cowl 14 to slide along the longitudinal axis 104 between the closed and the open position.

In this manner, the first actuators 22 allow the thrust reverser 13 to operate in reverse thrust mode (FIGS. 10 and 11), by causing the movable cowl 14 and the first cascades 15 to slide together, and also allow the thrust reverser 13 to operate in thrust-cancelling mode (FIGS. 13 and 14), by causing only the movable cowl 14 to slide, where the first cascades 15 remain in the retracted position.

For this purpose, the first actuators 22 comprise, for example, cylinders that extend axially and that are evenly distributed about the longitudinal axis 104.

Each first cascade 15 is, for example, caused to slide by a single cylinder of the first actuators 22.

The cylinders of the first actuators 22 comprise, for example, two coaxial rods, an outer rod 221 and an inner rod 222, which are capable of sliding relative to one another. A stroke of the outer rod 221 is also shorter than that of the inner rod 222. The outer rod 221 is mounted such that it can axially slide as one piece with one of the first cascades 15, whereas the inner rod 222 is mounted such that it can axially slide as one piece with the movable cowl 14.

The cylinders of the first actuators 22 can be hydraulic, pneumatic or electric.

Thus, according to the third embodiment, when the thrust reverser 13 is operating in reverse thrust mode (FIGS. 10 and 11), the first actuators 22 cause, on the one hand, the movable cowl 14 to slide from the closed position into the open position, the movable cowl 14 in turn causing the reverser doors 18 to pivot from the retracted position into the deployed position, and on the other hand the first cascades 15 to slide from the retracted position into the extended position. When the movable cowl 14 reaches the open position, when the first cascades 15 reach the extended position and when the reverser doors 18 reach the deployed position, the thrust reverser 13 is in the second state and the gas stream flowing along the secondary flow path 105 blocked by the reverser doors 18 is exhausted to the outside through the first cascades 15 in the extended position which direct said gas stream to upstream of the nacelle 10B, thus producing a counter-thrust oriented to upstream of the nacelle 10B.

When the thrust reverser 13 is operating in thrust-cancelling mode (FIGS. 13 and 14), the first actuators 22 cause the movable cowl 14 to slide from the closed position into the open position, the movable cowl 14 in turn causing the reverser doors 18 to pivot from the retracted position into the deployed position, whereas they hold the first cascades 15 in the retracted position. When the movable cowl 14 reaches the open position and when the reverser doors 18 reach the deployed position, with the first cascades 15 remaining in the retracted position, the thrust reverser 13 is in the third state and the gas stream flowing along the secondary flow path 105 blocked by the reverser doors 18 is exhausted to the outside through the opening 17 defined between the annular envelope 11 and the movable cowl 14 in the open position, producing practically no thrust or counter-thrust. In other words, the thrust produced is substantially zero.

According to a fourth embodiment shown in FIG. 15, the opening 17 defined between the annular envelope 11 and the movable cowl 14 is left unblocked in the third state of the thrust reverser 13 and the actuating mechanism comprises at least one second actuator 26 designed to selectively:

cause the first cascades 15 to slide along the longitudinal axis 104 from the retracted position into the extended position, when the first actuators 22 cause the movable cowl 14 to slide along the longitudinal axis 104 from the closed position into the open position, and from the extended position into the retracted position, when the first actuators 22 cause the movable cowl 14 to slide along the longitudinal axis 104 from the open position into the closed position;

hold the first cascades 15 in the retracted position, when the first actuators 22 cause the movable cowl 14 to slide along the longitudinal axis 104 between the closed position and the open position.

In this manner, the movable cowl 14 and the first cascades 15 are caused to slide independently of one another. When the thrust reverser 13 is operating in reverse thrust mode, the first and second actuators 22, 26 cause the movable cowl 14 and the first cascades 15 to slide simultaneously. Conversely, when the thrust reverser 13 is operating in thrust-cancelling mode, the first cascades 15 are held in the retracted position and only the movable cowl 14 is caused to slide by the first actuators 22.

The second actuators 26 are, for example, supported by the annular envelope 11.

The second actuators 26 comprise, for example, cylinders that extend axially and that are evenly distributed about the longitudinal axis 104.

Each first cascade 15 is, for example, caused to slide by a single cylinder of the second actuators 26.

The cylinders of the second actuators 26 can be hydraulic, pneumatic or electric.

Thus, according to the fourth embodiment, when the thrust reverser 13 is operating in reverse thrust mode, the first actuators 22 cause the movable cowl 14 to slide from the closed position into the open position, the movable cowl 14 in turn causing the reverser doors 18 to pivot from the retracted position into the deployed position, whereas second actuators 26 cause the first cascades 15 to slide from the retracted position into the extended position. When the movable cowl 14 reaches the open position, when the first cascades 15 reach the extended position and when the reverser doors 18 reach the deployed position, the thrust reverser 13 is in the second state and the gas stream flowing along the secondary flow path 105 blocked by the reverser doors 18 is exhausted to the outside through the first cascades 15 in the extended position which direct said gas stream to upstream of the nacelle 10C, thus producing a counter-thrust oriented to upstream of the nacelle 10C.

When the thrust reverser 13 is operating in thrust-cancelling mode, the first actuators 22 cause the movable cowl 14 to slide from the closed position into the open position, the movable cowl 14 in turn causing the reverser doors 18 to pivot from the retracted position into the deployed position, whereas the first cascades 15 are held in the retracted position. When the movable cowl 14 reaches the open position and when the reverser doors 18 reach the deployed position, with the first cascades 15 remaining in the retracted position, the thrust reverser 13 is in the third state and the gas stream flowing along the secondary flow path 105 blocked by the reverser doors 18 is exhausted to the outside through the opening 17 defined between the annular envelope 11 and the movable cowl 14 in the open position, producing practically no thrust or counter-thrust. In other words, the thrust produced is substantially zero.

What is claimed is:

1. Nacelle for an aircraft bypass turbomachine wherein an intake air stream flows in an upstream to a downstream direction, separating into a primary flow channel and a secondary flow channel, the nacelle comprising:

a fixed annular envelope extending about a longitudinal axis of the nacelle, a thrust reverser comprising:

an annular movable cowl extending about the longitudinal axis and located downstream of the annular envelope, the movable cowl being able to slide relative to the annular envelope along the longitudinal axis between a closed position, wherein the movable cowl and the annular envelope jointly define an annular and continuous outer surface of the nacelle, and an open position wherein the movable cowl and the annular envelope define therebetween an opening oriented radially relative to the longitudinal axis, said opening extending circumferentially about the longitudinal axis, at least one first movable thrust-reversing cascade, capable of occupying a retracted position wherein, with the movable cowl in the closed position, the at least one first cascade is housed inside the annular envelope, and an extended position wherein, with the movable cowl in the open position, the at least one first cascade extends across the opening, such that at least a part of the secondary stream is capable of passing through the at least one first cascade in the extended position in order to emerge outside the nacelle with a velocity that is oriented so as to generate a negative thrust along the longitudinal axis, the movable cowl and the at least one first cascade being connected to an actuating mechanism capable of moving them together, wherein said actuating mechanism is designed to allow for a partial or total thrust-cancelling configuration of the thrust reverser wherein the movable cowl is moved into the open position thereof while holding the at least one first cascade in the retracted position thereof, and in that in said thrust-cancelling configuration, the opening is occupied by at least one second thrust-reducing cascade of the thrust reverser, in such a way that the secondary stream passing through the opening emerges outside the nacelle with a velocity that is oriented so as to generate a substantially zero or positive thrust along the longitudinal axis.

2. The nacelle according to claim 1, wherein the actuating mechanism is designed to selectively:
move the movable cowl and the at least one first cascade by sliding along the longitudinal axis respectively from the closed position into the open position and from the retracted position into the extended position;
hold the at least one first cascade in the retracted position and move the movable cowl by sliding along the longitudinal axis between the closed position and the open position.

3. The nacelle according to claim 2, wherein the actuating mechanism comprises at least one first actuator designed to cause the movable cowl to slide along the longitudinal axis between the closed position and the open position.

4. The nacelle according to claim 3, wherein the actuating mechanism comprises at least one first blocking member designed to block the at least one first cascade from sliding relative to the movable cowl along the longitudinal axis, in a first blocking position, and to unblock the at least one first cascade such that the at least one first cascade can slide relative to the movable cowl along the longitudinal axis, in a second blocking position.

5. The nacelle according to claim 4, wherein the actuating mechanism comprises at least one second blocking member designed to unblock the at least one first cascade such that the at least one first cascade can slide relative to the annular envelope along the longitudinal axis, in a third blocking position, and to block the at least one first cascade from sliding relative to the annular envelope along the longitudinal axis, the at least one first cascade being in the retracted position, in a fourth blocking position.

6. The nacelle according to claim 1, wherein the at least one second thrust-reducing cascade is designed to selectively:
occupy a retracted position wherein the at least one second cascade is housed inside the annular envelope of the nacelle, said at least one second cascade in the retracted position being radially superimposed relative to the longitudinal axis with the at least one first cascade when the movable cowl is in the closed position;
remain in the retracted position when the movable cowl and the at least one first cascade slide respectively from the closed position into the open position and from the retracted position into the extended position;
slide relative to the annular envelope of the nacelle along the longitudinal axis from the retracted position into an extended position wherein the at least one second cascade occupies the opening defined between the movable cowl and the annular envelope, when the at least one first cascade is in the retracted position and when the movable cowl slides from the closed position into the open position.

7. The nacelle according to claim 6, wherein the at least one second cascade is arranged radially outside the at least one first cascade relative to the longitudinal axis.

8. The nacelle according to claim 6, wherein the actuating mechanism is designed to selectively:
hold the at least one second cascade in the retracted position and move the movable cowl and the at least one first cascade by sliding along the longitudinal axis respectively from the closed position into the open position and from the retracted position into the extended position;
hold at least one first cascade in the retracted position and move the movable cowl and the at least one second cascade by sliding along the longitudinal axis respectively from the closed position into the open position and from the retracted position into the extended position.

9. The nacelle according to claim 6, wherein the actuating mechanism comprises at least one first blocking member designed to:
on the one hand, block the at least one first cascade from sliding relative to the movable cowl along the longitudinal axis, in a first blocking position, and unblock the at least one first cascade such that the at least one first cascade can slide relative to the movable cowl along the longitudinal axis, in a second blocking position; and
on the other hand, unblock the at least one second cascade such that the at least one second cascade can slide relative to the movable cowl along the longitudinal axis, in the first blocking position, and block the at least one second cascade from sliding relative to the movable cowl along the longitudinal axis, in the second blocking position.

10. The nacelle according to claim 9, wherein the actuating mechanism comprises at least one second blocking member designed to:
on the one hand, unblock the at least one first cascade such that the at least one first cascade can slide relative to the annular envelope along the longitudinal axis, in a third blocking position, and block the at least one first cascade from sliding relative to the annular envelope along the longitudinal axis, the at least one first cascade being in the retracted position, in a fourth blocking position;
on the other hand, block the at least one second cascade from sliding relative to the annular envelope along the longitudinal axis, the at least one second cascade being in the retracted position, in the third blocking position, and unblock the at least one second cascade such that the at least one second cascade can slide relative to the annular envelope along the longitudinal axis, in the fourth blocking position.

11. Aircraft bypass turbomachine comprising, upstream to downstream in an axial direction of flow of a gas, a fan and a separation nozzle from which emerge an annular primary flow channel and an annular secondary flow channel surrounding the primary flow channel, the turbomachine furthermore being ducted by a nacelle according to claim 1.

12. Aircraft comprising at least one bypass turbomachine according to claim 11.

* * * * *